United States Patent
Herold et al.

(10) Patent No.: US 12,084,531 B2
(45) Date of Patent: Sep. 10, 2024

(54) HIGH REFRACTIVE INDEX COMPOSITIONS AND USES THEREOF

(71) Applicant: PPG Industries Ohio, Inc., Cleveland, OH (US)

(72) Inventors: Robert D. Herold, Monroeville, PA (US); Jeremy J. Hay, Somerset, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 577 days.

(21) Appl. No.: 17/415,408

(22) PCT Filed: Dec. 17, 2019

(86) PCT No.: PCT/US2019/066714
§ 371 (c)(1),
(2) Date: Jun. 17, 2021

(87) PCT Pub. No.: WO2020/131786
PCT Pub. Date: Jun. 25, 2020

(65) Prior Publication Data
US 2022/0041779 A1   Feb. 10, 2022

Related U.S. Application Data

(60) Provisional application No. 62/931,235, filed on Nov. 6, 2019, provisional application No. 62/781,344, filed on Dec. 18, 2018.

(51) Int. Cl.
| C08F 228/02 | (2006.01) |
| B29D 11/00 | (2006.01) |
| B29K 33/04 | (2006.01) |
| G02B 1/04 | (2006.01) |

(52) U.S. Cl.
CPC ...... *C08F 228/02* (2013.01); *B29D 11/00413* (2013.01); *B29D 11/00442* (2013.01); *G02B 1/041* (2013.01); *B29K 2033/04* (2013.01); *B29K 2909/08* (2013.01); *B29K 2995/0031* (2013.01); *B29K 2995/007* (2013.01); *B29K 2995/0082* (2013.01); *C08F 2810/20* (2013.01)

(58) Field of Classification Search
CPC .. C08F 228/02; C08F 2810/20; C08F 220/00; C08F 222/24; C08F 2/44; B29D 11/00413; B29D 11/00442; G02B 1/041; B29K 2033/04; B29K 2909/08; B29K 2995/0031; B29K 2995/007; B29K 2995/0082; C08L 33/10; C08L 41/00
See application file for complete search history.

(56) References Cited

U.S. PATENT DOCUMENTS

| 5,741,831 A | 4/1998 | Keita et al. |
| 6,184,323 B1 | 2/2001 | Jiang |
| 6,646,104 B1 | 11/2003 | Mori et al. |
| 6,699,953 B2 | 3/2004 | Oshikiri et al. |
| 7,687,597 B2 | 3/2010 | Bojkova |

FOREIGN PATENT DOCUMENTS

| EP | 1409562 A1 | 4/2004 |
| JP | 2-83501 A | 3/1990 |
| JP | 2003-268049 A | 9/2003 |
| WO | 03011925 A1 | 2/2003 |

*Primary Examiner* — Jessica M Roswell
(74) *Attorney, Agent, or Firm* — Krisanne Shideler

(57) ABSTRACT

Compositions including a combination of (meth)acryloyl-terminated monomers and oligomers prepared by co-reacting reactants having active hydrogen groups with an acrylating agent are disclosed. Polymerizates formed using the combinations of (meth)acryloyl-terminated monomers and oligomers exhibit a high hardness, excellent thermomechanical properties, and a high refractive index. The compositions can be used to fabricate optical components.

24 Claims, 2 Drawing Sheets

HIGH REFRACTIVE INDEX COMPOSITIONS AND USES THEREOF

CROSS REFERENCE TO RELATED APPLICATION

This application is the United States national phase of International Application No. PCT/US2019/066714 filed Dec. 17, 2019, and claims priority to United States Provisional Patent Application Nos. 62/781,344, filed Dec. 18, 2018, and 62/931,235, filed Nov. 6, 2019, the disclosures of which are hereby incorporated by reference in their entirety.

FIELD

Compositions comprising a combination of (meth)acryloyl-terminated monomers and oligomers are prepared by co-reacting reactants having active hydrogen groups with an acrylating agent. Polymerizates formed using the combinations of (meth)acryloyl-terminated monomers and oligomers exhibit a high hardness, excellent thermomechanical properties, and a high refractive index. The compositions can be used to fabricate optical components.

BACKGROUND

Polymerizable compositions having a high sulfur content are useful for forming optical components. The polymerizable compositions typically contain (meth)acryloyl-terminated monomers that react in the presence of free radicals. The (meth)acryloyl-terminated monomers can be prepared by reacting individual reactants containing terminal active hydrogens with an acrylating agent. The yield of this reaction can be low due to the formation of insoluble oligomers formed by reacting the active hydrogen groups with the alkenyl of the (meth)acryloyl group of the acrylating agent.

Improved polymerizable compositions for use in forming polymerizates having a high hardness, useful thermomechanical properties and high refractive index are desired.

SUMMARY

According to the present invention, compositions comprise:
(a) a first (meth)acryloyl-terminated monomer, wherein the first (meth)acryloyl-terminated monomer has the structure of Formula (1):

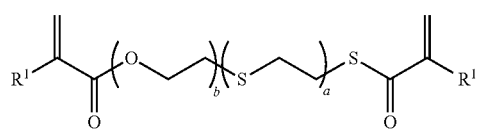

(1)

wherein
each $R^1$ is independently selected from hydrogen or methyl;
b is selected from 0 or 1; and
a is an integer from 1 to 6; and
(b) a second (meth)acryloyl-terminated monomer comprising two or more (meth)acryloyl groups, wherein each of the two or more (meth)acryloyl groups is independently selected from a (meth)acryloyloxy group or a (meth)acryloylthio group;
at least one of the (meth)acryloyl groups is a (meth)acryloylthio group; and
the second (meth)acryloyl-terminated monomer (b) is different than the first (meth)acryloyl-terminated monomer.

According to the present invention, compositions comprise the reaction product of reactants comprising:
(i) a first reactant, having two active hydrogen groups, the first reactant having the structure of Formula (5):

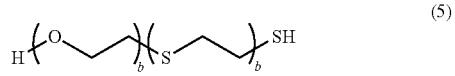

(5)

wherein b is selected from 0 or 1; and a is an integer from 1 to 6;
(ii) a second reactant comprising two or more active hydrogen groups, wherein
each of the two or more active hydrogen groups is independently selected from hydroxyl or thiol;
at least one of the two or more active hydrogen groups is a thiol; and
the second reactant is different than the first reactant; and
(iii) a third reactant comprising an acrylating agent.

According to the present invention, polymerizable compositions comprise a composition according to the present invention; and a free radical initiator.

According to the present invention, articles comprise a polymerizate according to the present invention.

According to the present invention, methods of fabricating an article comprise: forming the polymerizable composition according to the present invention into a shape; and curing the applied composition to provide the article.

According to the present invention, articles are fabricated using methods according to the present invention.

According to the present invention, methods of synthesizing a composition comprise:
(A) combining reactants (i), (ii), and (iii) to form a mixture, wherein the reactants comprise:
(i) a first reactant, having two active hydrogen groups, the first reactant having the structure of Formula (5):

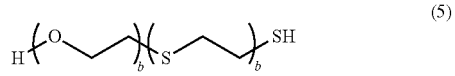

(5)

wherein b is selected from 0 or 1; and a is an integer from 1 to 6; and
(ii) a second reactant comprising two or more active hydrogen groups, wherein
each of the two or more active hydrogen groups is independently selected from hydroxyl or thiol;
at least one of the two or more active hydrogen groups is a thiol; and
the second reactant is different than the first reactant; and
(iii) a third reactant, wherein the third reactant comprises an acrylating agent; and
(B) reacting the mixture in the presence of a base to provide the combination of (meth)acryloyl-terminated monomers and (meth)acryloyl-terminated oligomers.

BRIEF DESCRIPTION OF THE DRAWINGS

The drawings described herein are for illustration purposes only. The drawings are not intended to limit the scope of the present disclosure.

DETAILED DESCRIPTION

Figure 1:
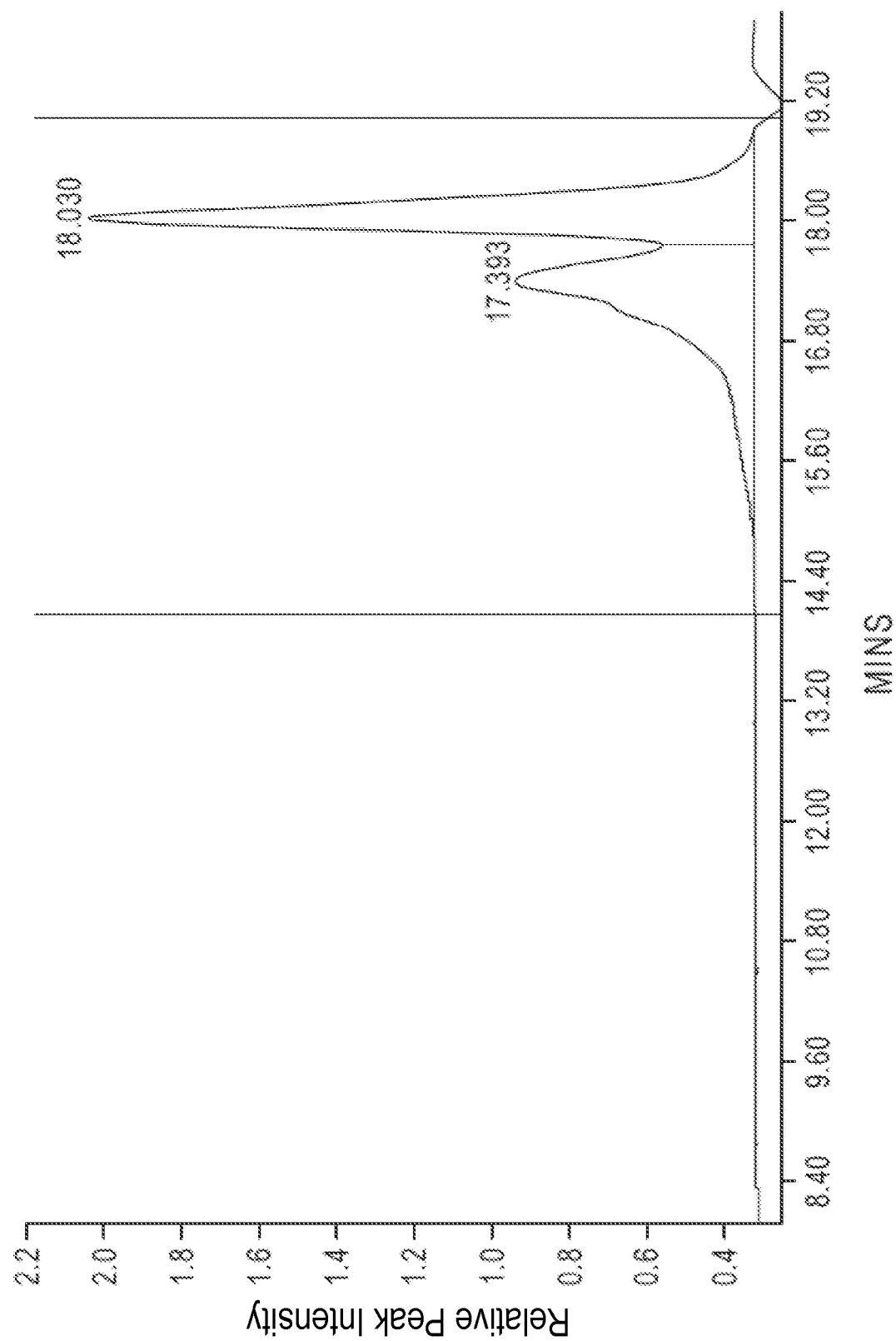
FIG. 1 shows a gel permeation chromatography chromatogram of a combination of (meth)acryloyl-terminated monomers and oligomers provided by the present disclosure.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —CONH$_2$ is attached through the carbon atom.

"Alkanediyl" refers to a diradical of a saturated or unsaturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{24}$ alkanediyl, or $C_{2-3}$ alkanediyl. Examples of alkanediyl groups include methanediyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, and dodecane-1,12-diyl. Alkanediyl groups can include single, double, and/or triple bonds between carbon atoms.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkenyl" group refers to the structure —CR=C(R)$_2$ where the alkenyl group is a terminal group and is bonded to a larger molecule. In such embodiments, each R may independently comprise, for example, hydrogen or $C_{1-3}$ alkyl. Each R can be hydrogen and an alkenyl group can have the structure —CH=CH$_2$.

"Alkoxy" refers to a —OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group is $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzenediyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon monoradical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

"(Heterocycloalkane)alkane diyl" refers to an alkanecycloalkanediyl group in which one or more of the cycloalkane carbon atoms are replaced with a heteroatom, such as, N, O, S, or P.

"Heteroarenediyl" refers to an arenediyl group in which one or more of the carbon atoms are replaced with a heteroatom, such as N, O, S, or P. In a heteroarenediyl, the one or more heteroatoms can comprise N or O.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means a chemical reaction product(s) of at least the recited reactants, and can include partial reaction products as well as fully reacted products and other reaction products that are present in a lesser amount. For example, a "prepolymer comprising the reaction product of reactants" refers to a prepolymer or combination of prepolymers that are the reaction product of at least the recited reactants. The reactants can further comprise additional reactants.

The term "equivalent" refers to the number of functional reactive groups of the substance. "Equivalent weight" is effectively equal to the molecular weight of a substance, divided by the valence or number of functional reactive groups of the substance.

A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

"Substituted" refers to a group in which one or more hydrogen atoms are each independently replaced with the same or different substituent(s). A substituent can comprise halogen, —S(O)$_2$OH, —S(O)$_2$, —SH, —SR where R is $C_{1-6}$ alkyl, —COOH, —NO$_2$, —NR$_2$ where each R independently comprises hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, or —COR where R is $C_{1-6}$ alkyl. A substituent can be —OH, —NH$_2$, or $C_{1-3}$ alkyl.

"Derived from" as in "a moiety derived from a compound" refers to a moiety that is generated upon reaction of a parent compound with a reactant. For example, a bis (alkenyl) compound CH$_2$=CH—R—CH=CH$_2$ can react with another compound such as two compounds having thiol groups to produce the moiety —(CH$_2$)$_2$—R—(CH$_2$) 2-derived from the reaction of the alkenyl groups with the thiol groups. For example, for a parent diisocyanate having the structure O=C=N—R—N=C=O, a moiety derived from the diisocyanate has the structure —C(O)—NH—R—NH—C(O)—. As another example, for a parent non-linear short chain diol having the structure HO—R—OH, a moiety derived from the non-linear short-chain diol has the structure —O—R—O—.

"Derived from the reaction of —V with a thiol" refers to a moiety —V'— that results from the reaction of a thiol group with a moiety comprising a terminal group reactive with a thiol group. For example, a group V— can comprise CH$_2$=CH—CH$_2$—O—, where the terminal alkenyl group CH$_2$=CH— is reactive with a thiol group —SH. Upon reaction with a thiol group, the moiety —V'— is —CH$_2$—CH$_2$—CH$_2$—O—.

"Composition" is intended to encompass a product comprising the specified components in the specified amounts, as well as any product which results, directly or indirectly, from the combination of the specified ingredients in the specified amounts.

"Molecular weight" refers to a theoretical molecular weight estimated from the chemical structure of a compound such as a monomeric compound, or a number average molecular weight as appropriate for a prepolymer determined, for example, using gel permeation chromatography using polystyrene standards.

"Thioether" refers to a compound having one or more thioether, —S—, groups. A thioether can also be referred to as a thiaalkylene. A polythioether refers to a compound having two or more thioether, —S—, groups. A polythioether can also be referred to as a polythiaalkylene.

The "micro-indentation hardness", also referred to as the Martens hardness, is measured according to ISO 14577-07 using a Fischerscope H-100SMC, available from Fischer Technology, Inc.

The "Fischer micro-hardness" or "Fischer Hardness" was measured using a Fischerscope H-100SMC, available from Fischer Technology, Inc. at a load of 300 milliNewton (mN), following a load application of 0-300 mN in 15 seconds.

The "Abbe number" is measured using a Metricon Model 2010M prism coupler according to ASTM C1648.

The "refractive index" is determined using a Metricon Model 2010M prism coupler according to ASTM C1648 at 20 degrees Centigrade (° C.) at a wavelength of 546.07 nanometers (nm) (the mercury e-line) and are reported as $n_e^{20}$.

The "E' storage modulus" is measured according to ASTM D5023 "Standard Test Method for Plastics. Dynamic Mechanical Properties: In Flexure (Three-Point Bending)" using a Perkin Elmer Diamond Dynamic Mechanical Analysis (DMA) analyzer.

The "yellowness Index" is measured using a HunterLab UltraScan PRO according to ASTM E313.

Compounds may be identified either by their chemical structure and/or chemical name. Certain compounds are named using the ChemBioDraw Ultra 14.0.0.117 (CambridgeSoft, Cambridge, MA) nomenclature program. When the chemical structure and chemical name conflict the chemical structure is determinative of the identity of the compound. The compounds described herein may comprise one or more stereogenic centers and/or double bonds and therefore may exist as stereoisomers such as double-bond isomers (i.e., geometric isomers), enantiomers, diastereomers, or atropisomers. Accordingly, any chemical structures within the scope of the specification depicted, in whole or in part, with a relative configuration encompass all possible enantiomers and stereoisomers of the illustrated compounds including the stereoisomerically pure form (e.g., geometrically pure, enantiomerically pure, or diastereomerically pure) and enantiomeric and stereoisomeric mixtures. Enantiomeric and stereoisomeric mixtures may be resolved into their component enantiomers or stereoisomers using separation techniques or chiral synthesis techniques.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Compositions provided by the present disclosure comprise a combination of (meth)acryloyl-terminated monomers and oligomers. The compositions can be used to form polymerizates that exhibit a high hardness and a high refractive index.

The combination of (meth)acryloyl-terminated monomers and oligomers can comprise a first (meth)acryloyl-terminated monomer, a second (meth)acryloyl-terminated monomer wherein the second (meth)acryloyl-terminated monomer is different than the first monomer, and a (meth)acryloyl-terminated oligomer.

A first (meth)acryloyl-terminated monomer can comprise a (meth)acryloyl-terminated monomer having the structure of Formula (1):

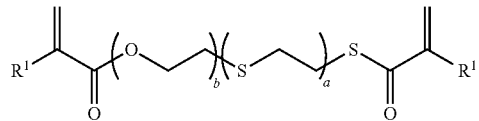

where each $R^1$ can independently be selected from hydrogen or methyl; b is selected from 0 or 1; and a is an integer from 1 to 6.

In monomers of Formula (1) each $R^1$ can be hydrogen, or each $R^1$ can be methyl.

In monomers of Formula (1), b can be 0, or b can be 1.

In monomers of Formula (1), a can be an integer from 1 to 5, from 1 to 4, from 1 to 3, or from 1 to 2.

In monomers of Formula (1), a can be 1, 2, 3, 4, 5, or 6.

In monomers of Formula (1), a can be selected from 1 or 2.

In monomers of Formula (1), each $R^1$ can be hydrogen; b can be 0, and a can be 1 or 2.

In monomers of Formula (1), each $R^1$ can be methyl; b can be 0, and a can be 1 or 2.

In monomers of Formula (1), each $R^1$ can be hydrogen; b can be 1, and a can be 1 or 2.

In monomers of Formula (1), each $R^1$ can be methyl; b can be 1, and a can be 1 or 2.

A first (meth)acryloyl-terminated monomer can include a combination of monomers having the structure of Formula (1).

Examples of monomers of Formula (1) include bis(2-methacryloylthioethyl)sulfide, bis(2-acryloylthioethyl)sulfide, 2-acryloyloxyethyl-2'-acryloylthioethyl sulfide, 2-methacryloyloxyethyl-2'-methacryloylthioethyl sulfide, or combinations thereof.

The first (meth)acryloyl-terminated monomer can comprise bis(2-methacryloylthioethyl)sulfide (1a).

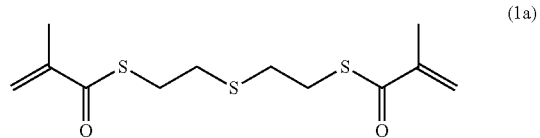 [SMILES: C=C(C)C(=O)SCCSCCSC(=O)C(=C)C]

A second (meth)acryloyl-terminated monomer has a different structure than the first (meth)acryloyl-terminated monomer.

The second (meth)acryloyl-terminated monomer can comprise two or more (methyl)acryloyl groups, where each of the two or more (meth)acryloyl groups is independently selected from a (meth)acryloyloxy group or a (meth)acryloylthio group; at least one of the (meth)acryloyl groups is a (meth)acryloylthio group; and the second (meth)acryloyl-terminated monomer is different than the first (meth)acryloyl-terminated monomer.

The second (meth)acryloyl-terminated monomer can comprise:

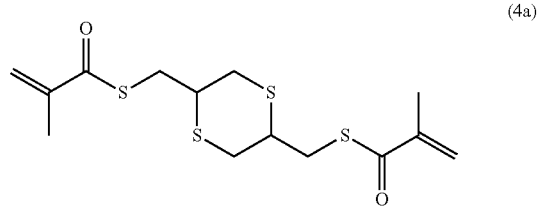

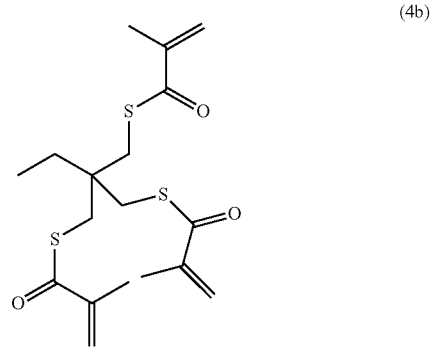

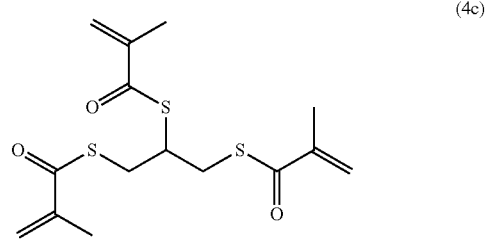

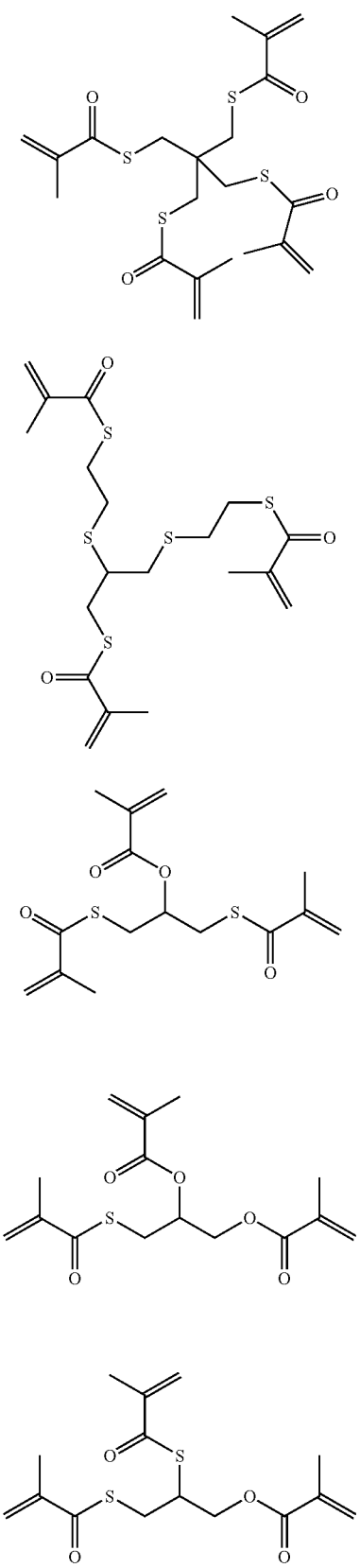

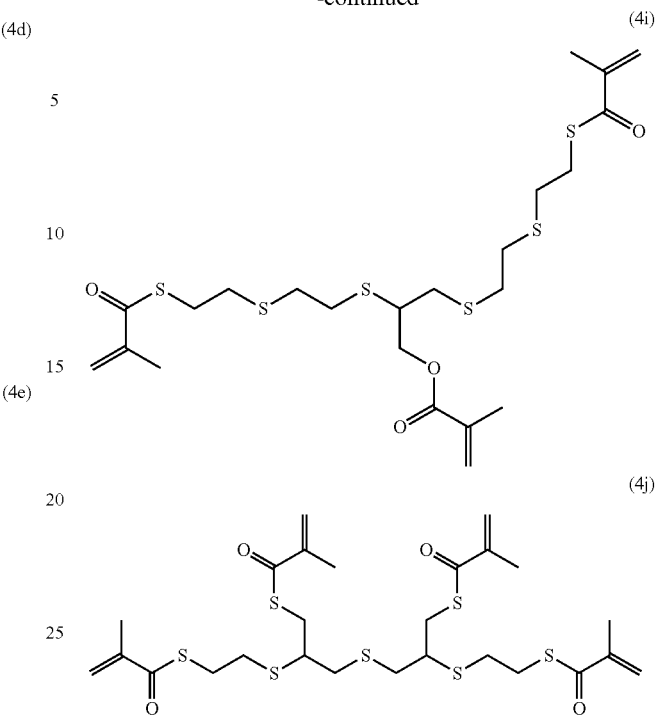

The second (meth)acryloyl-terminated monomer can comprise 2,5-bis(methacryloylthiomethyl)1,4-dithiane (4a), 2-ethyl-2-((meth)acryloylthiomethyl)-1,3-bis[(meth)acryloylthio]propane (4b), 1,2,3-tris[(meth)acryloylthio]propane (4c), 2,2-bis[(meth)acryloylthiomethyl]-1,3-bis[(meth)acryloylthio]propane (4d), 4-(meth)acryloylthiomethyl-3,6-dithia-1,8-bis[(meth)acryloylthio]octane (4e), 1,3-bis[(meth)acryloylthio]-2-(meth)acryloyloxypropane (4f), 1-(meth)acryloylthio-2,3-bis[(meth)acryloyloxy]propane (4 g), 1,2-bis[(meth)acryloylthio]-3-(meth)acryloyloxypropane (4 h), 7-(meth)acryloyloxymethyl-3,6,9,12-tetrathia-1,14-bis[(meth)acryloylthio]tetradecane (4i), 7-[2-(meth)acryloyloxyethyl]-3,6,8,11-tetrathia-1,13-bis[(meth)acryloylthio]tridecane, 4,8-bis[(meth)acryloylthiomethyl]-3,6,9-trithia-1,11-bis[(meth)acryloylthio]undecane (4j) or regioisomers of (4j) such as the 4,7- or 5,7-regioisomers, or a combination of any of the foregoing.

The second (meth)acryloyl-terminated monomer can comprise a cyclic (meth)acryloyl-terminated monomer having the structure of Formula (2), a branched (meth)acryloyl-terminated monomer having the structure of Formula (3), or a combination thereof:

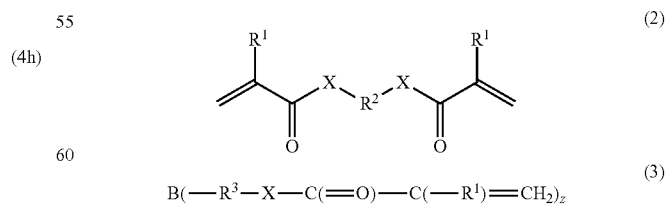

wherein
z is an integer from 3 to 6;
each $R^1$ is independently selected from hydrogen or methyl;

each X is independently selected from O or S; and at least one X is S;

$R^2$ is selected from (heterocycloalkane)alkane-diyl, $C_{6-20}$ heteroalkanearene-diyl, substituted (heterocycloalkane)alkane-diyl, or substituted $C_{6-20}$ heteroalkanearene-diyl;

$R^3$ is selected from $C_{1-12}$ alkane-diyl, $C_{2-12}$ heteroalkane-diyl, $C_{5-12}$ heterocycloalkane-diyl, $C_{6-12}$ heteroarene-diyl, (heterocycloalkane)alkane-diyl, $C_{6-20}$ heteroalkanearene-diyl, substituted $C_{2-12}$ alkane-diyl, substituted $C_{2-12}$ heteroalkane-diyl, substituted $C_{5-12}$ heterocycloalkane-diyl, substituted $C_{6-12}$ heteroarene-diyl, substituted (heterocycloalkane)alkane-diyl, or substituted $C_{6-20}$ heteroalkanearene-diyl; and B is a polyfunctional moiety.

In monomers of Formula (2) and Formula (3) the one or more heteroatoms can be S.

In monomers of Formula (2) and branched monomers Formula (3), each $R^1$ can be hydrogen, or each $R^1$ can be methyl.

In monomers of Formula (2) and Formula (3), each X can be S.

In monomers of Formula (2), one X can be O, and one X can be S.

In monomers of Formula (2), $R^2$ can be (heterocycloalkane)alkane-diyl.

In monomers of Formula (2), $R^2$ can have the structure:

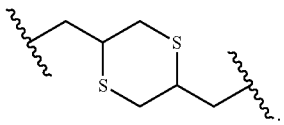 [SMILES: *CC1CSC(C*)CS1]

Examples of suitable cyclic monomers of Formula (2) include 2,5-bis(methacryloylthiomethyl)1,4-dithiane.

In monomers of Formula (3), one X can be S and each of the other X can be O.

In monomers of Formula (3), two X can be S and each of the other X can be O.

In monomers of Formula (3), z can be an integer from 3 to 5, or from 3 to 4.

In monomers of Formula (3), z can be 3, 4, 5, or 6.

In monomers of Formula (3), $R^3$ can be selected from $C_{2-12}$ alkane-diyl or $C_{5-12}$ heteroalkane-diyl.

In branched monomers of Formula (3), B can be $HC(-)_3$ or other polyfunctional moiety.

The second (meth)acryloyl-terminated monomer can comprise a polythioether (polythiaalkylene) moiety. For example, the second (meth)acryloyl-terminated monomer can comprise an aliphatic polythiaalkylene moiety. A polythiaalkylene moiety can be a cyclic polythiaalkylene moiety or a branched polythiaalkylene moiety. Examples of suitable second (meth)acryloyl-terminated monomers comprising cyclic polythiaalkylene moieties include 2,5-bis(methacryloylthiomethyl)1,4-dithiane. Examples of suitable second (meth)acryloyl-terminated monomers comprising branched polythiaalkylene moieties include monomers having three or more (meth)acryloyl groups such as from 3 to 6 (meth)acryloyl groups. Examples of suitable second (meth)acryloyl-terminated monomers comprising branched polythiaalkylene moieties include 4-(meth)acryloylthiomethyl-3,6-dithia-1,8-bis[(meth)acryloylthio]octane, 7-(meth)acryloyloxymethyl-3,6,9,12-tetrathia-1,14-bis[(meth)acryloylthio]tetradecane, 4,8-bis[(meth)acryloylthiomethyl]-3,6,9-trithia-1,11-bis[(meth)acryloylthio]undecane or regioisomers thereof such as the 4,7- and 5,7-regioisomers, 2-ethyl-2-((meth)acryloylthiomethyl)-1,3-bis[(meth)acryloylthio]propane, or combinations of any of the foregoing.

The second (meth)acryloyl-terminated monomer can comprise two or more (meth)acryloylthio groups such as from 2 to 6, from 2 to 5, from 2 to 4, or from 2 to 3 (meth)acryloylthio groups.

The second (meth)acryloyl-terminated monomer can comprise at least one (meth)acryloylthio group and at least one (meth)acryloyloxy group. For example, the second (meth)acryloyl-terminated monomer can comprise one (meth)acryloylthio group, and from 1 to 5 (meth)acryloyloxy groups. The second (meth)acryloyl-terminated monomer can comprise two (meth)acryloylthio groups, and from 1 to 4 (meth)acryloyloxy groups; the second (meth)acryloyl-terminated monomer can comprise three (meth)acryloylthio groups, and from 1 to 3 (meth)acryloyloxy groups; the second (meth)acryloyl-terminated monomer can comprise four (meth)acryloylthio groups, and from 1 to 2 (meth)acryloyloxy groups; or the second (meth)acryloyl-terminated monomer can comprise five (meth)acryloylthio groups, and one (meth)acryloyloxy groups.

Examples of second (meth)acryloyl-terminated monomers of Formula (2) or Formula (3) include those with structures of Formula (4a)-(4j), as previously described.

Each of the first (meth)acryloyl-terminated monomer and the second (meth)acryloyl-terminated monomer can independently comprise, for example, greater than 15 weight percent (wt %) sulfur, greater than 20 wt % sulfur, or greater than 25 wt % sulfur, wherein wt % is based on the molecular weight of the respective monomer.

The relative amounts of the (meth)acryloyl-terminated monomers and oligomers can be selected such that a composition has a sulfur content greater than 15 wt %, greater than 25 wt %, greater than 28 wt %, or greater than 30 wt %, where wt % is based on the total weight of the monomers and oligomers in the composition.

The relative amounts of the (meth)acryloyl-terminated monomers and oligomers can be selected such that a composition has a sulfur content from 15 wt % to 55 wt % sulfur, such as from 20 wt % to 50 wt %, from 25 wt % to 50 wt %, or from 25 wt % to 45 wt % sulfur, where wt % is based on the total weight of the monomers and oligomers in the composition.

Each of the first (meth)acryloyl-terminated monomer and the second (meth)acryloyl-terminated monomer can independently comprise, for example, from 15 wt % to 55 wt % sulfur, such as from 20 wt % to 50 wt %, from 25 wt % to 50 wt %, or from 25 wt % to 45 wt % sulfur, where wt % is based on the molecular weight of the respective monomer.

Compositions provided by the present disclosure comprise an amount of the first (meth)acryloyl-terminated monomer and the second (meth)acryloyl-terminated monomer such that the composition comprises an excess of (meth)acryloyl equivalents associated with the first (meth)acryloyl-terminated monomer compared to the number of (meth)acryloyl equivalents associated with the second (meth)acryloyl-terminated monomer. Furthermore, the number of (meth)acryloyl equivalents associated with the first (meth)acryloyl-terminated monomer can be greater than the (meth)acryloyl equivalents associated with the second (meth)acryloyl-terminated monomer regardless of the (meth)acryloyl functionality of the second (meth)acryloyl-terminated monomer.

For example, in compositions provided by the present disclosure, the first (meth)acryloyl-terminated monomer can comprise a first (meth)acryloyl equivalents; the second (meth)acryloyl-terminated monomer can comprise a second (meth)acryloyl equivalents; and a ratio of the first (meth) acryloyl equivalents to the second (meth)acryloyl equivalents can be greater than 1:1 such as greater than 1.1:1, or greater than 2:1, or greater than 3:1, or greater than 5:1, or greater than 10:1, or greater than 20:1. For example, the ratio of (meth)acryloyl equivalents associated with the first (meth)acryloyl-terminated monomer to the second (meth) acryloyl-terminated monomer can be from 1:1 to 25:1, from 1.1:1 to 20:1, from 2:1 to 15:1, from 3:1 to 10:1 or from 5:1 to 10:1.

Compositions provided by the present disclosure can further comprise a (meth)acryloyl-terminated oligomer or a combination of (meth)acryloyl-terminated oligomers. As described in the context of reaction products, a (meth) acryloyl-terminated oligomer is derived from the reaction of a first reactant, a second reactant that is different than the first reactant, and an acrylating agent. The (meth)acryloyl-terminated oligomer has a molecular weight that is greater than the molecular weight of the first reactant and the second reactant.

Compositions provided by the present disclosure can comprise the reaction product of reactants comprising:

(a) a first reactant, having two active hydrogen groups, the first reactant having the structure of Formula (5):

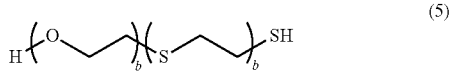

(5)

wherein b is selected from 0 or 1; and a is an integer from 1 to 6;

(b) a second reactant, comprising two or more active hydrogen groups, wherein, each of the two or more active hydrogen groups is independently selected from hydroxyl or thiol; at least one of the two or more active hydrogen groups is a thiol; and the second reactant is different than the first reactant; and (c) a third reactant comprising an acrylating agent.

In reactants of Formula (5), b can be 0, or b can be 1.
In reactants of Formula (5), a can be an integer from 1 to 5, from 1 to 4, from 1 to 3, or from 1 to 2.
In reactants of Formula (5), a can be selected from 1 or 2.
In reactants of Formula (5), a can be 1, 2, 3, 4, 5, or 6.
Examples of reactants of Formula (5) include bis(2-mercaptoethyl)sulfide (5a).

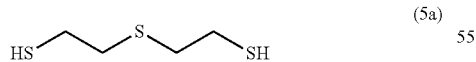

(5a)

The second reactant can comprise, for example, from 2 to 6 active hydrogen groups, such as from 2 to 5, from 2 to 4, or from 2 to 3 active hydrogen groups. The second reactant can comprise, for example, 2, 3, 4, 5, or 6 active hydrogen groups. The second reactant can be a combination of reactants having different functionalities such that the average functionality of active hydrogen groups can be a non-integer value from 2 to 6, from 2 to 5, from 2 to 4, or from 2 to 3.

Examples of suitable active hydrogen groups include hydroxyl groups and thiol groups.

The second reactant can comprise a cyclic reactant having the structure of Formula (6), a branched reactant having the structure of Formula (7), or a combination thereof:

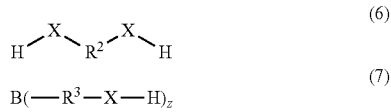

(6)

(7)

wherein
z is an integer from 3 to 6;
each X is independently selected from O or S; and at least one X is S; and
$R^2$ is selected from (heterocycloalkane)alkane-diyl, $C_{6-20}$ heteroalkanearene-diyl, substituted (heterocycloalkane)alkane-diyl, or substituted $C_{6-20}$ heteroalkanearene-diyl;
$R^3$ is selected from $C_{1-12}$ alkane-diyl, $C_{2-12}$ heteroalkane-diyl, $C_{5-12}$ heterocycloalkane-diyl, $C_{6-12}$ heteroarene-diyl, (heterocycloalkane)alkane-diyl, $C_{6-20}$ heteroalkanearene-diyl, substituted $C_{2-12}$ alkane-diyl, substituted $C_{2-12}$ heteroalkane-diyl, substituted $C_{5-12}$ heterocycloalkane-diyl, substituted $C_{6-12}$ heteroarene-diyl, substituted (heterocycloalkane)alkane-diyl, or substituted $C_{6-20}$ heteroalkanearene-diyl; and
B is a polyfunctional moiety.

In reactants of Formula (6) and Formula (7) each of the one or more heteroatoms X can be S.

In reactants of Formula (6) and Formula (7) each of the one or more substituent groups can be independently selected from thiol (—SH) or hydroxyl (—OH).

The second reactant can comprise, for example, 4,8-dimercaptomethyl-1,11-dimercapto-3,6,9-trithiaundecane, 4-mercaptomethyl-3,6-dithia-1,8-octanedithiol (2,2'-((3-mercaptopropane-1,2-diyl)bis(sulfanediyl))bis(ethane-1-thiol)), 7-hydroxymethyl-3,6,9,12-tetrathia-1,14-tetradecanedithiol (2,3-bis((2-((2-mercaptoethyl)thio)ethyl)thio)propan-1-ol) and/or isomers thereof, 2,5-dimercaptomethyl-1,4-dithiane ((1,4-dithiane-2,5-diyl)dimethanethiol), or combinations of any of the foregoing.

The second reactant can comprise, for example, 2,5-dimercaptomethyl-1,4-dithiane (8a), 2-ethyl-2-(mercaptomethyl)propane-1,3-dithiol (8b), 1,2,3-trimercaptopropane (8c), 2,2-bis(mercaptomethyl)propane-1,3-dithiol (8d), 4-mercaptomethyl-3,6-dithia-1,8-octanedithiol (8e), 1,3-dimercapto-2-propanol (8f), 3-mercapto-1,2-propanediol (8 g), 2,3-dimercapto-1-propanol (8 h), 7-hydroxymethyl-1,14-dimercapto-3,6,9,12-tetrathiatetradecane (8i), 7-[2-(hydroxyethyl)]-1,13-dimercapto-3,6,8,11-tetrathiatridecane, 4,8-bis(mercaptomethyl)-1,11-dimercapto-3,6,9-trithiaundecane (8j) or regioisomers of (8j) such as the 4,7- or 5,7-regioisomers, 2-mercapto-1,3-propanediol (8k), or combinations of any of the foregoing. These compounds have the structure of Formula (8a)-(8k):

(8a)

(8b)

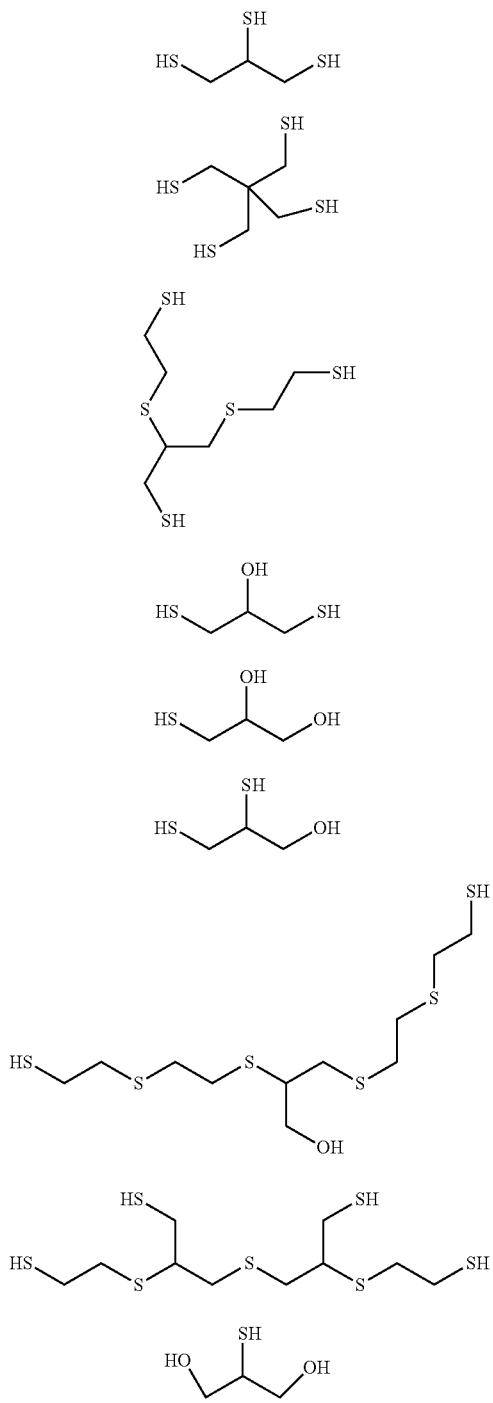

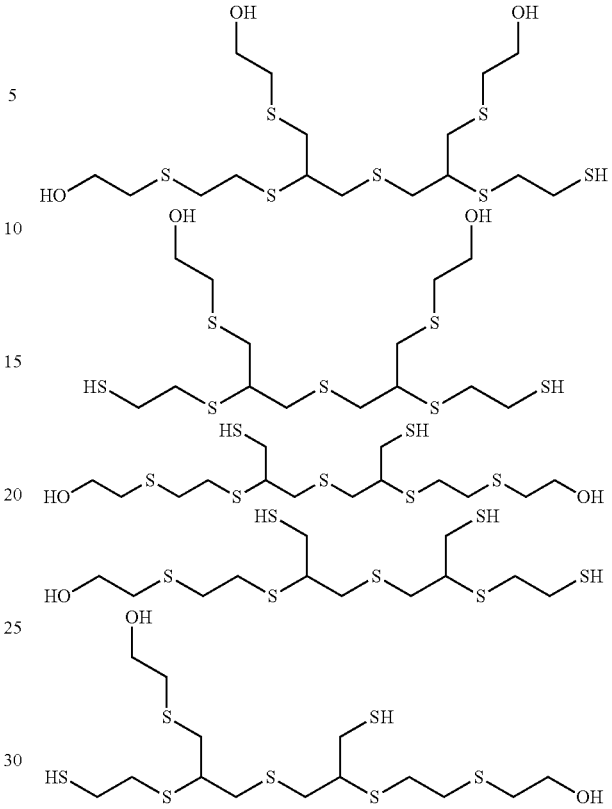

Thiol-containing reactants provided by the present disclosure can comprise partially alkoxylated reactants in which at least one or more of the thiol groups has been extended, for example, with a —CH$_2$—CH$_2$—OH, —CH(—CH$_3$)—CH$_2$—OH, or —CH(—CH$_3$)$_2$—CH$_2$—OH group. Thiol groups can be ethoxylated by reacting with, for example an ethylene oxide. For example, partially ethoxylated reactants of Formula (8j) can have the structure:

The first reactant, the second reactant, or both the first and second reactants can comprise one or more ethoxylated thiol groups.

Examples of suitable acrylating agents include (meth)acryloyl chloride and (meth)acrylic anhydride. In certain embodiments, the acrylating agent is (meth)acryloyl chloride.

In the reactants, the ratio of the equivalents of active hydrogen groups (i.e., the sum of hydroxyl and thiol equivalents) of the first reactant to the equivalents of active hydrogen groups of the second reactant is greater than 1:1.

For example, the active hydrogen group equivalents ratio of the first reactant to the second reactant can be greater than 2:1, greater than 3:1, greater than 4:1, greater than 5:1, greater than 6:1, greater than 7:1, or greater than 8:1.

The active hydrogen group equivalents ratio of the first reactant to the second reactant can be, for example, from 2:1 to 10:1, from 3:1 to 9:1, from 4:1 to 8:1, or from 5:1 to 7:1.

The reaction products can comprise a first (meth)acryloyl-terminated monomer, a second (meth)acryloyl-terminated monomer that is different than the first (meth)acryloyl-terminated monomer, and a combination of (meth)acryloyl-terminated oligomers.

The first (meth)acryloyl-terminated monomer can be derived from the first reactant, the second (meth)acryloyl-terminated monomer can be derived from the second reactant, and the combination of (meth)acryloyl-terminated oligomers can be derived from the reaction of the first reactant, the second reactant, and the acrylating agent.

The first (meth)acryloyl-terminated monomer derived from the first reactant can comprise a reactant having the structure of Formula (1).

The second (meth)acryloyl-terminated monomer derived from the second reactant can comprise the second reactant terminated in (meth)acryloyl groups. The second (meth)acryloyl-terminated monomer derived from the second reactant can comprise a (meth)acryloyl-terminated monomer of Formula (2), of Formula (3), or a combination thereof.

The combination of (meth)acryloyl-terminated oligomers can be derived from the reaction of the active hydrogen groups of the first reactant and the active hydrogen groups of the second reactant with the acrylating agent and via Michael addition with the activated alkenyl of the (meth)acrylate.

The (meth)acryloyl-terminated oligomer can comprise moieties derived from the first and from the second reactants. For example, a (meth)acryloyl-terminated oligomer can comprise from 1 to 50 moieties derived from the first reactant and from 1 to 50 moieties derived from the second reactant. A (meth)acryloyl-terminated oligomer can independently comprise from 1 to 40, from 1 to 30, from 1 to 20, from 1 to 10, or from 1 to 5, of moieties derived from the first and second reactants Each of the first reactant and the second reactant can independently comprise, for example, from 15 wt % to 55 wt % sulfur, such as from 20 wt % to 50 wt %, from 25 wt % to 50 wt %, or from 25 wt % to 45 wt % sulfur, where wt % is based on the molecular weight of the respective reactant.

The combination of (meth)acryloyl-terminated oligomers can have an average (meth)acryloyl functionality greater than the functionality of the second reactant. For example, the combination of oligomers can have an average (meth)acryloyl functionality greater than 3, greater than 5, greater than 7, or greater than 9. The combination of oligomers can have an average (meth)acryloyl functionality, for example, from 3 to 10, from 4 to 10, or from 6 to 10.

The combination of (meth)acryloyl-terminated oligomers can comprise, for example, from 1 to 50 moieties derived from the first reactant and from 1 to 50 moieties derived from the second reactants.

A (meth)acryloyl-terminated oligomer can comprise, for example, from 15 wt % to 55 wt % sulfur, such as from 20 wt % to 50 wt %, from 25 wt % to 50 wt %, or from 25 wt % to 45 wt % sulfur, where wt % is based on the molecular weight of the oligomer or combination of oligomers.

Methods of synthesizing a composition comprising a combination of (meth)acryloyl-terminated monomers and (meth)acryloyl-terminated oligomers can comprise:
(A) combining reactants (i), (ii), and (iii) to form mixture, wherein the reactants comprise:
(i) a first reactant, having two active hydrogen groups, the first reactant having the structure of Formula (5):

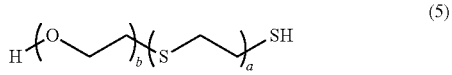

(5)

wherein b is selected from 0 or 1; and a is an integer from 1 to 6;
(ii) a second reactant comprising two or more active hydrogen groups, wherein
each of the two or more active hydrogen groups are selected from hydroxyl or thiol;
at least one of the two or more active hydrogen groups is a thiol; and
the second reactant (ii) is different than the first reactant (i); and (iii) a third reactant, wherein the third reactant comprises an acrylating agent; and
(B) reacting the mixture in the presence of a base to provide the combination of (meth)acryloyl-terminated monomers and (meth)acryloyl-terminated oligomers.

Methods of synthesizing compositions provided by the present disclosure can include the steps of (1) forming salts of active hydrogen-containing reactants (i) and (ii), individually or combined, by reacting with at least a quantitative amount of a strong base such as but not limited to sodium hydroxide (NaOH), potassium hydroxide (KOH), or an alkoxide relative to the amount of active hydrogen equivalents; (2) combining the salts with an acrylating agent (iii), for example, by adding the acrylating agent to the salts, adding the salts to the acrylating agent, or by simultaneously combining the salts and the acrylating agent; and (3) removing the water-soluble salt byproducts.

Methods of synthesizing compositions provided by the present disclosure can include (1) combining the active hydrogen-containing reactants and an acrylating agent; (2) adding a quantitative amount of a strong base such as NaOH, KOH, or an alkoxide relative to the amount of active hydrogen equivalents; and (3) removing the water-soluble salt byproducts.

Methods of synthesizing compositions provided by the present disclosure can include partially alkoxylating the second reactant to form the corresponding alcohols on a portion of the thiol groups by reacting with an alkoxylating agent prior to addition of the strong base forming a partially alkoxylated second reactant. For example, a polythiol reactant can be partially ethoxylated such that a portion of the thiol groups is extended with less than 1 oxirane equivalent functional material such as ethylene oxide relative to the number of thiol equivalents. For example, less than 0.9 equivalents, less than 0.75 equivalents, or less than 0.5 equivalents of the thiols can be alkoxylated.

The acrylating agent can comprise (meth)acryloyl chloride or (meth)acrylic anhydride. For example, the acrylating agent can be (meth)acryloyl chloride.

Suitable bases include alkali bases, non-limiting examples of which include sodium hydroxide and potassium hydroxide, an alkoxide such as sodium alkoxide, or a combination of any of the foregoing.

The reaction can be carried out in the presence of a solvent such as, for example, chlorinated hydrocarbons including dichloromethane and chloroform; ethers including diethyl ether, dibutylether, and tert-butylmethyl ether; esters including ethyl acetate and butyl acetate, or combinations of any of the foregoing.

The reaction mixture can also include water.

The reaction mixture can further comprise free radical inhibitors. Non-limiting examples of suitable free radical inhibitors include phenols such as 4-methoxyphenol, 4-tert-butylcatechol, or combinations of any of the foregoing.

In the reaction mixture, the ratio of equivalents of acrylating agent to equivalents of active hydrogen groups can be, for example, 1:1 or greater than 1:1 such as greater than 1.05:1, greater than 1.08:1, greater than 1.1:1, greater than 1.15:1, greater than 1.2:1, greater than 1.4:1, greater than 1.6:1, greater than 1.8:1, or greater than 1.9:1.

In the reaction mixture, the ratio of equivalents of acrylating agent to equivalents of active hydrogen groups can be, for example, from 1:1 to 2:1, from 1:1 to 1.5:1, from 1:1 to 1.25:1, or from 1:1 to 1.1:1.

In the reaction mixture, the ratio of equivalents of base to equivalents of active hydrogen groups can be, for example, 1:1 or greater than 1:1 such as greater than 1.05:1, greater than 1.08:1, greater than 1.1:1, greater than 1.15:1, greater than 1.2:1, greater than 1.4:1, greater than 1.6:1, greater than 1.8:1, or greater than 1.9:1.

In the reaction mixture, the ratio of equivalents of base to equivalents of active hydrogen groups can be, for example, from 1:1 to 2:1, from 1:1 to 1.5:1, from 1:1 to 1.25:1, or from 1:1 to 1.1:1.

The active hydrogen group equivalents ratio of the first reactant to the second reactant can be greater than 1:1, greater than 2:1, greater than 3:1, greater than 4:1, greater than 5:1, greater than 6:1, greater than 7:1, or greater than 8:1.

The active hydrogen group equivalents ratio of the first reactant to the second reactant can be, for example, from 1:1 to 25:1, from 1:1 to 20:1, from 1:1 to 15:1, from 1:1 to 10:1, from 2:1 to 10:1, from 3:1 to 8:1, or from 5:1 to 7:1.

The synthetic methods provided by the present disclosure provide compositions having a combination of (meth)acryloyl-terminated monomers and (meth)acryloyl-terminated oligomers with a yield, for example, greater than 60%, greater than 70%, greater than 80%, greater than 90%, or greater than 95%. The synthetic methods provided by the present disclosure provide compositions having a combination of (meth)acryloyl-terminated monomers and (meth)acryloyl-terminated oligomers with a yield, for example, from 70% to 100%, from 75% to 98%, or from 80% to 95%.

A polymerizable composition can comprise the combination of (meth)acryloyl-terminated monomers and (meth)acryloyl-terminated oligomers, a cure initiator and optionally one or more additives.

Polymerizable compositions provided by the present disclosure can comprise a cure initiator such as a free radical initiator. Polymerizable compositions can comprise one or more free radial initiators such as thermally-activated free radical initiators or free radical initiators activated by actinic radiation. A thermally activated free radical initiator can become active at elevated temperature, such as at a temperature greater than 25° C.

Examples of suitable thermally activated free radical initiators include organic peroxy compounds, azobis(organonitrile) compounds, N-acyloxyamine compounds, O-imino-isourea compounds, or combinations of any of the foregoing. Examples of suitable organic peroxy compounds, that may be used as thermal polymerization initiators include peroxymonocarbonate esters, such as tertiarybutylperoxy 2-ethylhexyl carbonate and tertiarybutylperoxy isopropyl carbonate; peroxyketals, such as 1,1-di-(tert-butyl peroxy)-3,3,5-trimethylcyclohexane; peroxydicarbonate esters, such as di(2-ethylhexyl)peroxydicarbonate, di(secondary butyl)peroxydicarbonate and diisopropylperoxydicarbonate; diacyperoxides such as 2,4-dichlorobenzoyl peroxide, isobutyryl peroxide, decanoyl peroxide, lauryl peroxide, propionyl peroxide, acetyl peroxide, benzoyl peroxide, and p-chlorobenzoyl peroxide; peroxyesters such as tert-butylperoxy pivalate, tert-butylperoxy octylate, and tert-butylperoxyisobutyrate; methylethylketone peroxide, acetylcyclohexane sulfonyl peroxide, or combinations of any of the foregoing. Other examples of suitable peroxy compounds include 2,5-dimethyl-2,5-di(2-ethylhexanoylperoxy)hexane, and/or 1,1-bis(tert-butylperoxy)-3,3,5-trimethylcyclohexane. Examples of suitable azobis(organonitrile) compounds that may be used as thermal polymerization initiators include azobis(isobutyronitrile), 2,2'-azobis(2-methyl-butanenitrile), and/or azobis(2/1-dimethylvaleronitrile). A thermally activated free radical initiator can comprise 1-acetoxy-2,2,6,6-tetramethylpiperidine and/or 1,3-dicyclohexyl-O—(N-cyclohexylideneamino)-isourea.

A free radical initiator can comprise a photoinitiator.

Polymerizable compositions provided by the present disclosure can include a photoinitiator or combination of photoinitiators. The radiation can be actinic radiation that can apply energy that can generate an initiating species from a photopolymerization initiator upon irradiation therewith, and widely includes α.-rays, γ-rays, X-rays, ultraviolet (UV) light including UVA, UVA, and UVC spectra), visible light, blue light, infrared, near-infrared, or an electron beam. For example, the photoinitiator can be a UV photoinitiator.

Examples of suitable UV photoinitiators include α-hydroxyketones, benzophenone, α,α.-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, and bisacyclophosphine oxide.

Examples of suitable benzophenone photoinitiators include 2-hydroxy-2-methyl-1-phenyl-1-propanone, 2-hydroxy-1,4,4-(2-hydroxyethoxy)phenyl]-2-methyl-1-propanone, α-dimethoxy-α-phenylacetophenone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

Examples of suitable oxime photoinitiators include (hydroxyimino)cyclohexane, 1-[4-(phenylthio)phenyl]-octane-1,2-dione-2-(O-benzoyloxime), 1-[9-ethyl-6-(2-methylbenzoyl)-9H-carbazol-3-yl]-ethanone-1-(0-acetyloxime), trichloromethyl-triazine derivatives), 4-(4-methoxystyryl)-2,6-trichloromethyl-1,3,5-triazine), 4-(4-methoxyphenyl)-2,6-trichloromethyl-1,3,5-triazine, and α-aminoketone (1-(4-morpholinophenyl)-2-dimethylamino-2-benzyl-butan-1-one).

Examples of suitable phosphine oxide photoinitiators include diphenyl (2,4,6-trimethylbenzoyl)-phosphine oxide (TPO) and phenylbis(2,4,6-trimethyl benzoyl) phosphine oxide (BAPO).

Other examples of suitable UV photoinitiators include the Irgacure™ products from BASF, for example the products Irgacure™ 184, Irgacure™ 500, Irgacure™ 1173, Irgacure™ 2959, Irgacure™ 745, Irgacure™ 651, Irgacure™ 369, Irgacure™ 907, Irgacure™ 1000, Irgacure™ 1300, Irgacure™ 819, Irgacure™ 819DW, Irgacure™ 2022, Irgacure™ 2100, Irgacure™ 784, or Irgacure™ 250; in addition, the Irgacure™ products from BASF are used, for example the products Irgacure™ MBF, Darocur™ 1173, Darocur™ TPO, Darocur™ 4265.

A UV photoinitiator can comprise, for example, 2,2-dimethoxy-1,2-diphenylethan-1-one (Irgacure® 651, Ciba Specialty Chemicals), 2,4,6-trimethylbenzoyl-diphenylphosphineoxide (Darocur® TPO, Ciba Specialty Chemicals), or a combination thereof.

Other examples of suitable photoinitiators include Darocur® TPO (available from Ciba Specialty Chemicals), Lucirin® TPO (available from BASF), Speedcure® TPO (available from Lambson), Irgacure® TPO (available from Ciba Specialty Chemicals, and Omnirad® (available from IGM Resins), or combinations of any of the foregoing.

Compositions provided by the present disclosure can comprise from 0.05 wt % to 5 wt %, from 0.1 wt % to 4.0 wt %, from 0.25 wt % to 3.0 wt %, or from 0.5 wt % to 1.5 wt % of a photoinitiator or combination of photoinitiators, where wt % is based on the total weight of the polymerizable composition.

Polymerizable compositions can further comprise a free radical inhibitor, a thermal stabilizer, a UV stabilizer, a UV absorber, a hindered amine light stabilizer, a dichroic material, a photochromic material, a polymerization moderator, a polymerization accelerator, a monomer having a single ethylenically unsaturated radially polymerizable group, a monomer having two or more ethylenically unsaturated radically polymerizable groups, a pigment, a dye, or a combination of any of the foregoing.

Polymerizable compositions provided by the present disclosure can comprise a free radical inhibitor or a combination of free radical inhibitors. Examples of suitable free radical inhibitors include 4-methoxyphenol, hydroquinone, pyrogallol, 2,4-dimethyl-6-tert-butylphenol, butylated hydroxytoluene (BHT), or 4-tert-butylcatechol.

Polymerizable compositions provided by the present disclosure can comprise a thermal stabilizer or a combination of thermal stabilizers.

Polymerizable compositions provided by the present disclosure can comprise a UV stabilizer or a combination of UV stabilizers. UV stabilizers include UV absorbers and hindered amine light stabilizers. Examples of suitable UV stabilizers include products under the tradenames Cyasorb® (Solvay), Uvinul® (BASF), and Tinuvin® (BASF).

Polymerizable compositions provided by the present disclosure can comprise a dichroic material or a combination of dichroic materials. Examples of suitable dichroic materials include azomethines, indigolds, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone, (poly)anthroquinones, anthropyrimidinones, iodine, and iodates.

Polymerizable compositions provided by the present disclosure can comprise a photochromic material or a combination of photochromic materials. A photochromic material can be a reversible photochromic material or a non-reversible photochromic material. A photochromic material can be a thermally reversible photochromic material or a thermally non-reversible photochromic material.

Polymerizable compositions provided by the present disclosure can comprise a third monomer or combination of third monomers having ethylenically unsaturated radically polymerizable groups or a combination of monomers having ethylenically unsaturated radically polymerizable groups, wherein the third monomer is different from the first monomer and from the second monomer.

A third monomer can have one ethylenically unsaturated radically polymerizable group, or more than one ethylenically unsaturated radically polymerizable groups. For example, a third monomer can comprise two ethylenically unsaturated radically polymerizable group, three ethylenically unsaturated radically polymerizable groups, or more than three ethylenically unsaturated radically polymerizable groups.

Polymerizable compositions provided by the present disclosure can comprise at least one third (meth)acryloyl-terminated monomer, wherein the at least one third (meth) acryloyl-terminated monomer is different from the first (meth)acryloyl-terminated monomer and the second (meth) acryloyl-terminated monomer.

Examples of suitable third monomers having a single ethylenically unsaturated radically polymerizable group include mono(meth)acrylates such as cyclohexyl (meth) acrylate, butyl (meth)acrylate, methyl (meth)acrylate, isobornyl (meth)acrylate, 2-phenoxyethyl (meth)acrylate, ethyl (meth)acrylate; vinyl ethers, styrene, or combinations of any of the foregoing.

Examples of suitable third monomers having more than one ethylenically unsaturated radically polymerizable group include ethylene glycol di(meth)acrylate), diethylene glycol di(meth)acrylate, triethylene glycol di(meth)acrylate, poly (ethylene glycol) di(meth)acrylate, trimethylolpropane poly (meth)acrylates, pentaerythritol poly(meth)acrylates, ditrimethylolpropane poly(meth)acrylates, dipentaerythritol poly (meth)acrylates, glycerol poly(meth)acrylates, bisphenol A di(meth)acrylate, ethoxylated bis-phenol A di(meth)acrylate, propoxylated bis-phenol A di(meth)acrylate, cyclohexane diol di(meth)acrylates, tris(2-hydroxyethyl) isocyanurate poly(meth)acrylates, divinyl benzene, or combinations of any of the foregoing.

Polymerizable compositions provided by the present disclosure can comprise a polymerization moderator or a combination of polymerization moderators. A polymerization moderator can minimize the formation of any distortions or defects, e.g., striations and or cracks/fissures, in polymerizates that may be obtained from the polymerizable compositions of the present invention. Examples of suitable polymerization moderators include dilauryl thiodipropionate, 1-isopropyl-4-methyl-1,4-cyclohexadiene (.gamma.-terpinene); 1-isopropyl-4-methyl-1,3-cyclohexadiene (.alpha.-terpinene); 1-methyl-4-(propan-2-ylidene)cyclohex-1-ene, (terpinolene); and alpha-methyl styrene dimer, 1,1-diphenylethylene, cis-1,2-diphenylethylene, 3,7,7-trimethylbicyclo[4.1.0]hept-3-ene (3-carene), 4-isopropenyl-1-methylcyclohexene (dipentene), (S)-(+4-isopropenyl-1-methylcyclohexene ((S)-limonene), 2,6-dimethyl-2,4,6-octatriene, 4-tert-butylpyrocatechol, triphenylmethane, or combinations of any of the foregoing.

A polymerization moderator can comprise 1-isopropyl-4-methyl-1,4-cyclohexadiene; 1-isopropyl-4-methyl-1,3-cyclohexadiene; 1-methyl-4-(propan-2-ylidene)cyclohex-1-ene; 2,6-dimethyl-2,4,6-octatriene, α-methyl styrene dimer, or a combination of any of the foregoing. An α-methyl styrene dimer refers to a polymerization moderator such as 2,4-diphenyl-4-methyl-1-pentene, and optionally at least one of 2,4-diphenyl-4-methyl-2-pentene and/or 2-phenyl-1-propene (which is also referred to as, α-methyl styrene). With some embodiments, the α-methyl styrene dimer polymerization moderator includes 90 to 93 percent by weight of 2,4-diphenyl-4-methyl-1-pentene, 6 to 8 percent by weight of 2,4-diphenyl-4-methyl-2-pentene, and 0.25 to 0.75 percent by weight of 2-phenyl-1-propene, the percent weights in each case being based on total weight of α-methyl styrene dimmer.

A composition can comprise, for example, from 0.01 wt % to 15 wt %, or from 0.1 wt % to 8 wt %, or from 0.3 wt % to 5 wt %, of a polymerization moderator, wherein wt % is based on the total weight of the composition.

Polymerizable compositions provided by the present disclosure can comprise a polymerization (or build-rate) accelerator or combinations of polymerization accelerators. A polymerization accelerator can increase the polymerization rate of the polymerizable composition of the present invention when exposed to actinic radiation. Examples of suitable polymerization accelerators include organophosphines, organophosphites, amines, or combinations of any of the foregoing. Examples of suitable polymerization accelerators can include compounds with aliphatic substitution, cycloaliphatic substitution, aryl substitution, or combinations thereof. Examples of suitable organophosphine polymerization accelerators include triethylphosphine, tripropylphosphine, tributylphosphine, triphenylphosphine, or a combination thereof. For example, the organophosphine polymerization accelerator can be triphenylphosphine. Examples of suitable organophosphite polymerization accelerators include triethylphosphite, tripropylphosphite, tributylphosphite, triphenylphosphite, or combinations thereof. For example, the organophosphite polymerization accelerator is triethylphosphite. In another example, the organophosphite polymerization accelerator can be triphenylphosphite. Examples of suitable amine polymerization accelerators include tertiary amines, such as triethylamine, N-methyldiethanolamine, N,N-dimethylcyclohexylamine, N,N-dicyclohexylmethylamine, tribenzylamine, and 1,4-diazabicyclo[2.2.2]octane. For example, the amine polymerization accelerator is triethylamine.

Compositions presented in the present disclosure can comprise, for example, from 0.001 wt. % to 10 wt %, from 0.01 wt % to 5 wt %, or from 0.05 wt % to 2 wt % of a polymerization accelerator or combination of polymerization accelerators, where wt % is based on the total weight of the polymerizable composition.

Polymerizable compositions provided by the present disclosure can comprise pigments, dyes, or a combination thereof.

Examples of suitable inorganic pigments include metal-containing inorganic pigments such as those containing cadmium, carbon, chromium, cobalt, copper, iron oxide, lead, mercury, titanium, tungsten, and zinc. Examples include ultramarine blue, ultramarine violet, reduced tungsten oxide, cobalt aluminate, cobalt phosphate, manganese ammonium pyrophosphate and/or metal-free inorganic pigments. In particular embodiments the inorganic pigment nanoparticles comprise ultramarine blue, ultramarine violet, Prussian blue, cobalt blue and/or reduced tungsten oxide. Examples of specific organic pigments include indanthrone, quinacridone, phthalocyanine blue, copper phthalocyanine blue, and perylene anthraquinone.

Additional examples of suitable pigments include iron oxide pigments, in all shades of yellow, brown, red and black; in all their physical forms and grain categories; titanium oxide pigments in all the different inorganic surface treatments; chromium oxide pigments also co-precipitated with nickel and nickel titanates; black pigments from organic combustion (e. g., carbon black); blue and green pigments derived from copper phthalocyanine, also chlorinated and brominated, in the various alpha, beta and epsilon crystalline forms; yellow pigments derived from lead sulphochromate; yellow pigments derived from lead bismuth vanadate; orange pigments derived from lead sulphochromate molybdate; yellow pigments of an organic nature based on arylamides; orange pigments of an organic nature based on naphthol; orange pigments of an organic nature based on diketo-pyrrolo-pyrrole; red pigments based on manganese salts of azo dyes; red pigments based on manganese salts of beta-oxynaphthoic acid; red organic quinacridone pigments; and red organic anthraquinone pigments.

Polymerizable compositions provided by the present disclosure can be cured by activating a free radical reaction, for example, by exposing the polymerizable composition to actinic radiation. A cured polymerizable composition is referred to as a polymerizate.

Polymerizates provided by the present disclosure can have a Fischer micro-hardness, for example, greater than 90 Newton per square millimeter (N/mm$^2$), greater than 100 N/mm$^2$, greater than 110 N/mm$^2$, greater than 120 N/mm$^2$, greater than 130 N/mm$^2$, greater than 140 N/mm$^2$ or greater than 150 N/mm$^2$, where the Fischer micro-hardness is measured using a Fischerscope H-100SMC, available from Fischer Technology, Inc. at a load of 300 mN, following a load application of 0-300 mN in 15 seconds.

Polymerizates provided by the present disclosure can have a Fischer micro-hardness, for example, from 90 N/mm$^2$ to 160 N/mm$^2$, from 100 N/mm$^2$ to 150 N/mm$^2$, from 110 N/mm$^2$ to 140 N/mm$^2$, or from 120 N/mm$^2$ to 140 N/mm$^2$, where the Fischer micro-hardness is measured using a Fischerscope H-100SMC, available from Fischer Technology, Inc. at a load of 300 mN, following a load application of 0-300 mN in 15 seconds.

Polymerizates provided by the present disclosure can have an Abbe number, for example, greater than or equal to 30, greater than or equal to 32, greater than or equal to 34, or greater than or equal to 36, where the Abbe number is measured using a Metricon Model 2010M prism coupler according to ASTM C1648. The Abbe number V$_D$ may be calculated according to Equation 1, $$v_d = \frac{n_d - 1}{n_f - n_c} \quad \text{Equation 1}$$

where n$_D$, n$_F$, and n$_C$ are the refractive indices of the material at the wavelengths of the Fraunhofer D-, F- and C-spectral lines, i.e., 589.3 nm, 486.1 nm, and 656.3 nm, respectively.

Polymerizates provided by the present disclosure can have an Abbe number, for example, from 30 to 50, from 32 to 45, or from 33 to 42, where the Abbe number is measured using a Metricon Model 2010M prism coupler according to ASTM C1648.

Polymerizates provided by the present disclosure can have a refractive index, for example, greater than 1.50, greater than 1.54, greater than 1.58, greater than 1.62, greater than 1.66, greater than 1.70, or greater than 1.74, where the refractive index is measured using a Metricon Model 2010M prism coupler according to ASTM C1648 at 20° C. at a wavelength of 546.07 nm (the mercury e-line) and are reported as n$_e^{20}$.

Polymerizates provided by the present disclosure can have a refractive index, for example, from 1.50 to 1.75, from 1.52 to 1.73, from 1.54 to 1.71, from 1.56 to 1.69, from 1.58 to 1.67, from 1.60 to 1.65, or from 1.61 to 1.64, where the refractive index is measured using a Metricon Model 2010M prism coupler according to ASTM C1648 at 20° C. at a wavelength of 546.07 nm (the mercury e-line) and are reported as n$_e^{20}$.

Polymerizates provided by the present disclosure can have an storage modulus (E'), for example, greater than 1.5 Gigapascal (GPa) at 25° C., greater than 2.0 GPa, greater than 2.5 GPa, greater than 3.0 GPa, or greater than 3.5 GPa, wherein the E' storage modulus is measured at 25° C. on samples of 3.5 millimeter (mm) thickness according to ASTM D5023 "Standard Test Method for Plastics. Dynamic Mechanical Properties: In Flexure (Three-Point Bending)" using a Perkin Elmer Diamond DMA analyzer.

Polymerizates provided by the present disclosure can have an E' storage modulus, for example, greater than 0.5 at 75° C., greater than 1.0 GPa, greater than 1.5 GPa, or greater than 2.0 GPa, wherein the E' storage modulus is measured at 75° C. on samples of 3.5 mm thickness according to ASTM D5023 "Standard Test Method for Plastics. Dynamic Mechanical Properties: In Flexure (Three-Point Bending)" using a Perkin Elmer Diamond DMA analyzer.

Polymerizates provided by the present disclosure can have a yellowness index, for example, less than 5, less than 4, less than 3, less than 2.8, less than 2.6, less than 2.4, or less than 2.2, where the yellowness index is measured using a HunterLab UltraScan PRO according to ASTM E313 on samples of 3.5 mm thickness.

Polymerizates provided by the present disclosure can have a yellowness index, for example, from 1.0 to 5.0, from 1.0 to 4.0, from 1.0 to 3.0, from 1.5 to 2.8, from 1.75 to 2.6, or from 2.0 to 2.5, where the yellowness index is measured using a HunterLab UltraScan PRO according to ASTM E313 on samples of 3.5 mm thickness.

Polymerizable compositions provided by the present disclosure can be used to fabricate articles such as optical components.

Articles can be fabricated with curable compositions provided by the present disclosure using any suitable methods such as by casting, additive manufacturing such as three-dimensional printing and ink-jet printing, transfer printing, or stereolithography.

For example, an article can be fabricated by forming a polymerizable composition into a shape and curing the polymerizable composition. Curing can comprise initiating a free radical reaction to cause the (meth)acryloyl groups to react to form a polymerizate. Initiating a free-radical reaction can comprise, for example, exposing the polymerizable composition to actinic radiation such as visible or UV radiation. The polymerizable composition can be exposed to the actinic radiation before the article is being shaped, while the article is being shaped, after the article is shaped, or a combination of any of the foregoing. After the free radical reaction has been initiated, the article can be exposed to a thermal treatment to accelerate completion of the cure. For example, the shaped article can be exposed to a temperature greater than 50° C., greater than 75° C., or greater than 100° C. for from 30 minutes to 2 hours.

Three-dimensional printing can be used to fabricate an article.

Three-dimensional printing may involve the deposition of sequential layers of a material to form an article. Polymerizable compositions provided by the present disclosure can be provided as one-part systems which can be pumped into a mixer and extruded under pressure through a nozzle. An article can be built by sequentially depositing layers of the polymerizable composition in the shape of the article. The free radical reaction can be initiated by exposing the polymerizable composition to heat or actinic radiation as the composition passes through the pump, the mixer, and/or the nozzle, and/or after the polymerizable composition has been deposited. A free radical initiator can be combined with a composition comprising the combination of (meth)acryloyl-terminated monomers and/or (meth)acryloyl-terminated oligomers, mixed, and then sequentially deposited to build an article. The free radical reaction can be initiated by exposing the polymerizable composition to heat and/or actinic radiation during or after mixing.

Polymerizable compositions and methods provided by the present disclosure can be used to fabricate a wide variety of optical components including, for example, optical displays, shields, windows, transparencies, windshields, eyeglasses, sunglasses, ophthalmic lenses, optical lenses, sports masks, face shields, goggles, imaging systems, cameras, optical components, optoelectronic devices, light-emitting diodes, lasers, photodetectors, photovoltaics, LIDAR imaging, telecommunication devices, and infrared communication devices.

Optical components fabricated using the compositions and methods provided by the present disclosure can include one or more coatings.

The one or more coatings can include wherein the one or more surface coatings comprises a scratch-resistant coating, an anti-reflective coating, a wavelength-selective reflective coating, a wavelength-selective absorptive coating, a planarization coating, a polarizing coating, or a combination of any of the foregoing.

ASPECTS OF THE INVENTION

The invention is further defined by the following aspects of the invention.

Aspect 1. A composition comprising:
(a) a first (meth)acryloyl-terminated monomer, wherein the first (meth)acryloyl-terminated monomer has the structure of Formula (1):

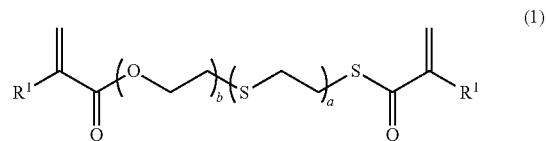

wherein
each $R^1$ is independently selected from hydrogen or methyl;
b is selected from 0 or 1; and
a is an integer from 1 to 6; and
(b) a second (meth)acryloyl-terminated monomer comprising two or more (meth)acryloyl groups, wherein,
each of the two or more (meth)acryloyl groups is independently selected from a (meth)acryloyloxy group or a (meth)acryloylthio group;
at least one of the (meth)acryloyl groups is a (meth)acryloylthio group; and
the second (meth)acryloyl-terminated monomer (b) is different than the first (meth)acryloyl-terminated monomer (a).

Aspect 2. The composition of aspect 1, wherein each $R^1$ is hydrogen.

Aspect 3. The composition of aspect 1, wherein each $R^1$ is methyl.

Aspect 4. The composition of any one of aspects 1 to 3, wherein b is 0.

Aspect 5. The composition of any one of aspects 1 to 3, wherein b is 1.

Aspect 6. The composition of any one of aspects 1 to 5, wherein a is selected from 1 or 2.

Aspect 7. The composition of aspect 1, wherein the first (meth)acryloyl-terminated monomer comprises bis(2-methacryloylthioethyl)sulfide:

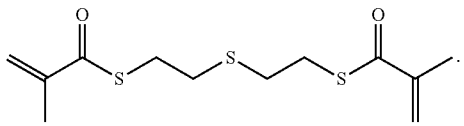 [SMILES: C=C(C)C(=O)SCCSCCSC(=O)C(=C)C]

Aspect 8. The composition of any one of aspects 1 to 7, wherein the second (meth)acryloyl-terminated monomer comprises a polythiaalkylene moiety.

Aspect 9. The composition of aspect 8, wherein the polythiaalkylene moiety is an aliphatic polythiaalkylene moiety.

Aspect 10. The composition of aspect 8, wherein the polythiaalkylene moiety is a cyclic polythiaalkylene moiety or a branched polythiaalkylene moiety.

Aspect 11. The composition of aspect 8, wherein the polythiaalkylene moiety is a branched polythiaalkylene moiety and the second (meth)acryloyl-terminated monomer comprises from 3 to 6 (meth)acryloyl groups.

Aspect 12. The composition of any one of aspects 1 to 11, wherein the second (meth)acryloyl-terminated monomer comprises two or more (meth)acryloylthio groups.

Aspect 13. The composition of any one of aspects 1 to 11, wherein the second (meth)acryloyl-terminated monomer comprises at least one (meth)acryloylthio group and at least one (meth)acryloyloxy group.

Aspect 14. The composition of any one of aspects 1 to 7, wherein the second (meth)acryloyl-terminated monomer comprises 2,5-bis(methacryloylthiomethyl)1,4-dithiane, 4-(meth)acryloylthiomethyl-3,6-dithia-1,8-bis[(meth)acryloylthio]octane, 7-(meth)acryloyloxymethyl-3,6,9,12-tetrathia-1,14-bis[(meth)acryloylthio]tetradecane, 4,8-bis[(meth)acryloylthiomethyl]-3,6,9-trithia-1,11-bis[(meth)acryloylthio]undecane or regioisomers thereof such as the 4,7- and 5,7-regioisomers, 2-ethyl-2-((meth)acryloylthiomethyl)-1,3-bis[(meth)acryloylthio]propane, 1,2,3-tris[(meth)acryloylthio]propane, or combinations of any of the foregoing.

Aspect 15. The composition of any one of aspects 1 to 7, wherein the second (meth)acryloyl-terminated monomer comprises 2,5-bis(methacryloylthiomethyl)1,4-dithiane:

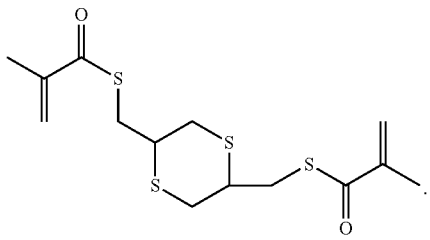 [SMILES: C=C(C)C(=O)SCC1CSC(CSC(=O)C(=C)C)CS1]

Aspect 16. The composition of any one of aspects 1 to 7, wherein the second (meth)acryloyl-terminated monomer comprises 4-(meth)acryloylthiomethyl-3,6-dithia-1,8-bis[(meth)acryloylthio]octane:

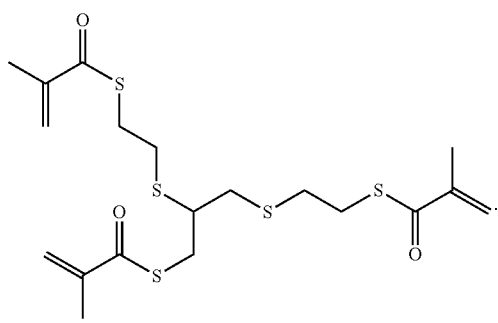 [SMILES: C=C(C)C(=O)SCCSCC(CSC(=O)C(=C)C)SCCSC(=O)C(=C)C]

Aspect 17. The composition of any one of aspects 1 to 16, wherein the composition further comprises a (meth)acryloyl-terminated oligomer.

Aspect 18. The composition of any one of aspects 1 to 17, wherein the composition comprises from 15 wt % to 60 wt % sulfur, such as 15 wt % to 55 wt % sulfur, wherein wt % is based on the total weight of the composition.

Aspect 19. The composition of any one of aspects 1 to 17, wherein the composition comprises from 25 wt % to 45 wt % sulfur, wherein wt % is based on the total weight of the composition.

Aspect 20. The composition of any one of aspects 1 to 19, wherein, the first (meth)acryloyl-terminated monomer comprises a first (meth)acryloyl equivalents; the second (meth)acryloyl-terminated monomer comprises a second (meth)acryloyl equivalents; and a ratio of the first (meth)acryloyl equivalents to the second (meth)acryloyl equivalents is greater than 1:1.

Aspect 21. The composition of aspect 20, wherein the ratio is greater than 1.1:1.

Aspect 22. The composition of aspect 20, wherein the ratio is from 1:1 to 25:1.

Aspect 23 A composition comprising the reaction product of reactants comprising:
(i) a first reactant having two active hydrogen groups, the first reactant having the structure of Formula (5):

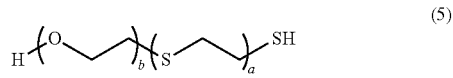

wherein b is selected from 0 or 1; and a is an integer from 1 to 6;
(ii) a second reactant, comprising two or more active hydrogen groups, wherein
each of the two or more active hydrogen groups is independently selected from hydroxyl or thiol;
at least one of the two or more active hydrogen groups is a thiol; and
the second reactant is different than the first reactant; and
(iii) a third reactant comprising an acrylating agent.

Aspect 24. The composition of aspect 23, wherein b is 0.
Aspect 25. The composition of aspect 23, wherein b is 1.
Aspect 26. The composition of any one of aspects 23 to 25, wherein a is selected from 1 or 2.
Aspect 27. The composition of aspect 23, wherein the first reactant comprises bis(2-mercaptoethyl)sulfide:

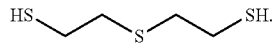

Aspect 28. The composition of any one of aspects 23 to 27, wherein the second reactant comprises 2,5-dimercaptomethyl-1,4-dithiane:

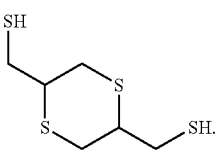

Aspect 29. The composition of any one of aspects 23 to 27, wherein the second reactant comprises 4-mercaptomethyl-3,6-dithia-1,8-octanedithiol:

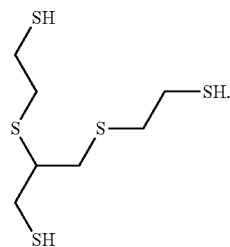 [SMILES: SCCSCC(CS)SCCS]

Aspect 30. The composition of any one of aspects 23 to 27, wherein the second reactant comprises 7-hydroxymethyl-1,14-dimercapto-3,6,9,12-tetrathiatetradecane.

Aspect 31. The composition of any one of aspects 23 to 27, wherein the second reactant comprises 2,5-dimercaptomethyl-1,4-dithiane, 2-ethyl-2-(mercaptomethyl)propane-1,3-dithiol, 1,2,3-trimercaptopropane, 2,2-bis(mercaptomethyl)propane-1,3-dithiol, 4-mercaptomethyl-3,6-dithia-1,8-octanedithiol, 1,3-dimercapto-2-propanol, 3-mercapto-1,2-propanediol, 2-mercapto-1,3-propanediol, 2,3-dimercapto-1-propanol, 7-hydroxymethyl-1,14-dimercapto-3,6,9,12-tetrathiatetradecane, 4,8-bis(mercaptomethyl)-1,11-dimercapto-3,6,9-trithiaundecane or regioisomers thereof such as the 4,7- and 5,7-regioisomers, or a combination of any of the foregoing.

Aspect 32. The composition of any one of aspects 23 to 31, wherein the first reactant, the second reactant, or both the first and second reactants comprise at least one ethoxylated thiol group.

Aspect 33. The composition of any one of aspects 23 to 32, wherein the acrylating agent comprises (meth)acryloyl chloride or (meth)acrylic anhydride.

Aspect 34. The composition of any one of aspects 23 to 33, wherein the active hydrogen group equivalents ratio of the first reactant to the second reactant is greater than 1:1.

Aspect 35. The composition of any one of aspects 23 to 33, wherein the active hydrogen group equivalents ratio of the first reactant to the second reactant is from 1:1 to 25:1.

Aspect 36. The composition of any one of aspects 23 to 35, wherein the reaction product comprises: a first (meth)acryloyl-terminated monomer, wherein the first (meth)acryloyl-terminated monomer is derived from the first reactant; a second (meth)acryloyl-terminated monomer, wherein the second (meth)acryloyl-terminated monomer is derived from the second reactant; and a combination of (meth)acryloyl-terminated oligomers, wherein the combination of (meth)acryloyl-terminated oligomers is derived from the reaction of the first reactant, the second reactant and the acrylating agent.

Aspect 37. The composition of any one of aspects 23 to 36, wherein the composition comprises from 15 wt % to 60 wt % sulfur, such as 15 wt % to 55 wt % sulfur, wherein wt % is based on the total weight of the composition.

Aspect 38. The composition of any one of aspects 23 to 36, wherein the composition comprises from 25 wt % to 45 wt % sulfur, wherein wt % is based on the total weight of the composition.

Aspect 39. A polymerizable composition, wherein the polymerizable composition comprises: the composition of any one of aspects 1 to 38; and a free radical initiator.

Aspect 40. The polymerizable composition of aspect 39, wherein the free radical initiator comprises a photoinitiator or a thermally-activated free radical initiator.

Aspect 41. The polymerizable composition of any one of aspects 39 to 40, further comprising a third monomer, wherein, the third monomer comprises one or more ethylenically unsaturated radically polymerizable groups; and the third monomer is different than the first (meth)acryloyl-terminated monomer and from the second (meth)acryloyl-terminated monomer.

Aspect 42. The polymerizable composition of any one of aspects 39 to 41, further comprising at least one third (meth)acryloyl-terminated monomer, wherein the at least one third (meth)acryloyl-terminated monomer is different from the first (meth)acryloyl-terminated monomer and from the second (meth)acryloyl-terminated monomer Aspect 43. The polymerizable composition of any one of aspects 39 to 42, wherein the polymerizable composition further comprises one or more of a thermal stabilizer, a UV stabilizer, a UV absorber, a hindered amine light stabilizer, a dichroic material, a photochromic material, a polymerization moderator, a polymerization accelerator, a pigment, a dye, or a combination of any of the foregoing.

Aspect 44. A polymerizable composition of aspect 43, wherein the polymerization accelerator can comprise an organophosphine, organophosphite, amine, or a combination of any of the foregoing.

Aspect 45. A polymerizate prepared from the polymerizable composition of any one of aspects 39 to 44.

Aspect 46. The polymerizate of aspect 45, wherein the polymerizate has a refractive index from 1.50 to 1.75, wherein the refractive index is measured using a Metricon Model 2010M prism coupler according to ASTM C1648 at 20° C. at a wavelength of 546.07 nm (the mercury e-line) and are reported as $n_e^{20}$.

Aspect 47. The polymerizate of aspect 45, wherein the polymerizate has a refractive index from 1.60 to 1.65, wherein the refractive index is measured using a Metricon Model 2010M prism coupler according to ASTM C1648 at 20° C. at a wavelength of 546.07 nm (the mercury e-line) and are reported as $n_e^{20}$.

Aspect 48. The polymerizate of any one of aspects 45 to 47, wherein the polymerizate has a Fischer micro-hardness greater than 90 N/mm$^2$, wherein the Fischer micro-hardness is measured using a Fischerscope H-100SMC, available from Fischer Technology, Inc. at a load of 300 mN, following a load application of 0-300 mN in 15 seconds.

Aspect 49. The polymerizate of any one of aspects 45 to 47, wherein the polymerizate has a Fischer micro-hardness greater than 120 N/mm$^2$, wherein the Fischer micro-hardness is measured using a Fischerscope H-100SMC, available from Fischer Technology, Inc. at a load of 300 mN, following a load application of 0-300 mN in 15 seconds.

Aspect 50. The polymerizate of any one of aspects 45 to 49, wherein the polymerizate has a storage modulus E' greater than 1.5 GPa at 25° C., wherein the E' storage modulus is measured on a sample of 3.5 mm thickness according to ASTM D5023 "Standard Test Method for Plastics. Dynamic Mechanical Properties: In Flexure (Three-Point Bending)" using a Perkin Elmer Diamond DMA analyzer.

Aspect 51. The polymerizate of any one of aspects 45 to 49, wherein the polymerizate has a storage modulus E' greater than 2.0 GPa at 25° C., wherein the E' storage modulus is measured on a sample of 3.5 mm thickness according to ASTM D5023 "Standard Test Method for Plastics. Dynamic Mechanical Properties: In Flexure (Three-Point Bending)" using a Perkin Elmer Diamond DMA analyzer.

Aspect 52. The polymerizate of any one of aspects 45 to 51, wherein the polymerizate has a storage modulus E' greater than 0.5 at 75° C., wherein the E' storage modulus is measured on a sample of 3.5 mm thickness according to ASTM D5023 "Standard Test Method for Plastics. Dynamic Mechanical Properties: In Flexure (Three-Point Bending)" using a Perkin Elmer Diamond DMA analyzer.

Aspect 53. The polymerizate of any one of aspects 45 to 51, wherein the cured polymer has a storage modulus E' greater than 1.0 GPa at 75° C., wherein the storage modulus E' is measured on a sample of 3.5 mm thickness according to ASTM D5023 "Standard Test Method for Plastics. Dynamic Mechanical Properties: In Flexure (Three-Point Bending)" using a Perkin Elmer Diamond DMA analyzer.

Aspect 54. The polymerizate of any one of aspects 45 to 53, wherein the polymerizate has an Abbe number greater than or equal to 30, where the Abbe number is measured using a Metricon Model 2010M prism coupler according to ASTM C1648.

Aspect 55. The polymerizate of any one of aspects 45 to 53, wherein the polymerizate has an Abbe number greater than or equal to 34, where the Abbe number is measured using a Metricon Model 2010M prism coupler according to ASTM C1648.

Aspect 56. An article comprising the polymerizate of any one of aspects 45 to 55.

Aspect 57. The article of aspect 56, wherein the article comprises one or more surface coatings.

Aspect 58. The article of aspect 57, wherein the one or more surface coatings comprises a scratch-resistant coating, an anti-reflective coating, a wavelength-selective reflective coating, a wavelength-selective absorptive coating, a planarization coating, a polarizing coating, or a combination of any of the foregoing.

Aspect 59. A method of fabricating an article comprising: forming the polymerizable composition of aspect 39 into a shape; and curing the applied composition to provide the article.

Aspect 60. The method of aspect 59, wherein forming comprises casting, additive manufacturing, three-dimensional printing, ink-jet printing, transfer printing, or stereolithography.

Aspect 61. The method of any one of aspects 59 to 60, wherein the method comprises exposing the composition to actinic radiation before forming the shape, after forming the shape, during forming the shape, or a combination of any of the foregoing.

Aspect 62. An article fabricated using the method of any one of aspects 59 to 61.

Aspect 63. The article of aspect 62, wherein the article comprises an optical display, a shield, a window, a transparency, a windshield, a sunglass, an eyeglass, an optical lens, a sport mask, a face shield, a goggle, an optical component, or an optoelectronic device.

Aspect 64. A method of synthesizing a composition comprising:
(A) combining reactants (i), (ii), and (iii) to form mixture, wherein the reactants comprise:
(i) a first reactant, having two active hydrogen groups, the first reactant having the structure of Formula (5):

(5)

wherein b is selected from 0 or 1; and a is an integer from 1 to 6; and
(ii) a second reactant comprising two or more active hydrogen groups, wherein
each of the two or more active hydrogen groups is independently selected from hydroxyl or thiol;
at least one of the two or more active hydrogen groups is a thiol; and
the second reactant is different than the first reactant; and
(iii) a third reactant, wherein the third reactant comprises an acrylating agent; and
(B) reacting the mixture in the presence of base to provide the combination of (meth)acryloyl-terminated monomers and (meth)acryloyl-terminated oligomers.

Aspect 65. The method of aspect 64, wherein the acrylating agent comprises (meth)acryloyl chloride or (meth)acrylic anhydride.

EXAMPLES

Embodiments provided by the present disclosure are further illustrated by reference to the following examples, which describe compositions, methods, and uses provided by the present disclosure. It will be apparent to those skilled in the art that many modifications, both to materials, and methods, may be practiced without departing from the scope of the disclosure.

Part 1

Synthesis of (Meth)Acryloyl-Terminated Monomers and Oligomers

Compositions comprising (meth)acryloyl-terminated monomers and oligomers were prepared using the amounts described in Table 1. First, a polythiol salt solution was prepared by dropwise addition of 1.0 equivalent of the indicated polythiol or mixture of polythiols to a solution of 1.03 equivalent of NaOH in water, with stirring, under a nitrogen atmosphere.

The polythiol salt solution was then added dropwise to a solution of 1.0 equivalent of methacryloyl chloride in dichloromethane under a nitrogen atmosphere, with mixing, and cooling to a reaction temperature from 0° C. to 5° C. For Example 6, the polythiol salt solution was added dropwise to a solution of 1.0 equivalent of methacryloyl chloride in ethyl acetate under a nitrogen atmosphere, with mixing, and cooling to a reaction temperature from 0° C. to 5° C. The solution was brought to 25° C. for an additional 2 to 3 hours, until iodine titration indicated the reaction was complete. The organic layer was collected and washed three times using (i) water, (ii) saturated sodium bicarbonate solution, and (iii) a saturated sodium chloride solution. To the organic phase was added 250 parts per million (ppm) of 4-methoxyphenol and 250 ppm of 4-tert-butylcatechol. Volatiles were removed by vacuum distillation, and the product was filtered to provide a composition comprising a combination of (meth)acryloyl-terminated monomers and (meth)acryloyl-terminated oligomers.

TABLE 1

Reactants used to prepare (meth)acryloyl-terminated monomers and oligomers.

| Reactants | Comparative Example 1 | Comparative Example 2 | Example 3 | Example 4 | Example 5 | Example 6 |
|---|---|---|---|---|---|---|
| bis(2-mercaptoethyl)sulfide[1] "first polythiol" | 1.0 | — | 0.865 | 0.818 | 0.72 | 0.865 |
| 4-mercaptomethyl-3,6-dithia-1,8-octanedithiol[2] "second polythiol" | — | 1.0 | 0.135 | 0.182 | — | 0.135 |
| 7-hydroxymethyl-1,14-dimercapto-3,6,9,12-tetrathiatetradecane[3] "second polythiol" | — | — | — | — | 0.28 | — |
| Methacryloyl Chloride[4] | 1.0 | 1.0 | 1.0 | 1.0 | 1.0 | — |
| Methacrylic Anhydride[4] | — | — | — | — | — | 1.0 |
| Sodium Hydroxide | 1.03 | 1.03 | 1.03 | 1.03 | 1.03 | 1.03 |
| 4-Methoxyphenol | 250 ppm | 250 ppm | 250 ppm | 250 ppm | 250 ppm | 250 ppm |
| 4-tert-Butylcatechol | 250 ppm | 250 ppm | 250 ppm | 250 ppm | 250 ppm | 250 ppm |
| Active hydrogen ratio (first polythiol:second polythiol) | N/A | 0 | 6.41 | 4.49 | 2.26 | 6.41 |
| Viscosity (cP) at 25° C. | — | — | 50-70 | — | — | 50-70 |
| Yield after filtration | 80-95 | 53[5] | 85-90 | 71 | 71 | 85-90 |

[1]Bis(2-mercaptoethyl)sulfide was acquired from Bruno Bock Chemische Fabrik GmbH & Co., in Marschacht, Germany under the trade name Thiocure ® DMDS.
[2]4-Mercaptomethyl-3,6-dithia-1,8-octanedithiol was acquired from Miwon Commercial Co., Ltd. in Danwon-gu, Ansan-si, Gyeonggi-do, South Korea, under the trade name Optimer 530.
[3]7-Hydroxymethyl-1,14-dimercapto-3,6,9,12-tetrathiatetradecane was synthesized utilizing the methods described in U.S. Pat. No. 7,687,597 B2.
[4]Methacryloyl chloride and methacrylic anhydride were acquired from Bimax Inc. in Glen Rock, PA, under the tradenames BX-MAN and BX-MAC, respectively.
[5]For Comparative Example 2, a significant amount of gelatinous byproduct was produced.

Part 2

Lens Casting

Each polymerizable composition of Comparative Examples 1 and 2, and Examples 3 through 5 was used to prepare a corresponding cast lens ("polymerizate") according to the following procedure.

Each polymerizable composition was transferred to a polypropylene vessel, to which 0.1% by weight of Darocure® 1173 photoinitiator (available from BASF) was added. The resulting mixture was stirred at 25° C. until homogeneous. The polymerizable composition including the photoinitiator was filtered and dispensed into a mold consisting of two flat disk shaped UV-transparent glass molds and with a plastic gasket (spacer) to control lens thickness. The internal dimensions of the mold cavity were designed to yield a final cured lens having a diameter of 75 mm and thickness of 3.5 mm. The filled molds were exposed to UV light via a UV irradiation device from LESCO Incorporated fitted with a Fusion UV Curing Systems F-300 focused beam microwave powered lamp, equipped with a D-bulb in which 64% of the emitted energy was between 300 and 400 nm. The UV intensities and dosage energies used are shown in the Table 2.

TABLE 2

UV Curing Parameters.

| Parameter | UVC (200-280 nm) | UVB (280-320 nm) | UVA (320-395 nm) | UVV (395-455 nm) |
|---|---|---|---|---|
| Intensity (Watt/cm$^2$) | 0.057 | 0.48 | 1.1 | 0.62 |
| Dosage (Joule/cm$^2$) | 0.72* | 5.9* | 12.4* | 7.3* |

*Values measured for one pass through the UV irradiation device.

A line speed of 1.5 feet per minute (ft/min) (0.45 meters per minute (m/min)) was used, and each filled mold assembly was passed under the UV light three times. Between passes, the mold was turned over to expose the opposite side to the UV light source. After exposing the polymerizable composition to UV radiation, a disk-shaped lens was recovered from the mold assembly and then heated at 100° C. for 1 hour. It was then used to measure physical properties.

Part 3

Physical Property Measurement

The following procedures were used to evaluate the properties of the polymerizates and the results are presented in Table 3.

Fischer Micro-Hardness

The micro-indentation hardness (also referred to as the Martens hardness, ISO 14577-07) was measured using a Fischerscope H-100SMC, available from Fischer Technology, Inc. The Fischer micro-hardness (or "Fischer Hardness") of the polymerizates within (±) 3 N/mm², was measured at a load of 300 mN, following a load application of 0 mN to 300 mN in 15 seconds. In general, higher Fischer micro-hardness is desirable for improved lens power retention and/or improved resistance to distortion during processing of optical materials.

E' Storage Modulus

Dynamic Mechanical Analysis DMA was carried out according to ASTM D5023 "Standard Test Method for Plastics. Dynamic Mechanical Properties: In Flexure (Three-Point Bending)" using a Perkin Elmer Diamond DMA analyzer. The storage modulus was reported as "DMA E' Storage Modulus" at 25° C., at 75° C., or at 95° C. on samples of 3.5 mm thickness. In general, higher E' storage modulus is desirable for improved lens power retention and/or improved resistance to distortion during processing of optical materials.

Refractive Index and Abbe Number

The refractive index and Abbe number were measured using a Metricon Model 2010M prism coupler according to ASTM C1648. Refractive index values were measured at 20° C. at a wavelength of 546.07 nm (i.e., the mercury e-line) and are reported as $n_e^{20}$. The Abbe number $V_D$ was calculated according to Equation 1, $$v_d = \frac{n_d - 1}{n_f - n_C}$$  Equation 1 where $n_D$, $n_F$, and $n_C$ are the refractive indices of the material at the wavelengths of the Fraunhofer D-, F- and C-spectral lines, i.e., 589.3 nm, 486.1 nm, and 656.3 nm, respectively. Abbe number is reported as "Abbe".

Higher refractive index is generally advantageous, since it may allow for the use of thinner, more cosmetically appealing lenses for a given prescription. Higher Abbe number is generally advantageous because it may result in clearer, less distorted images for the optical lens end user.

Part 4

GPC Molecular Weight Distribution Analysis

The molecular weight of the combination of (meth) acryloyl-terminated monomers and oligomers of Example 3 was determined using gel permeation chromatography (GPC), utilizing a Waters 2695 Liquid Chromatography (LC) instrument equipped with a Waters 2414 refractive index detector, two PL gel 5 micrometer (μm) MIXED-C 300×7.5 mm columns, and a PerkinElmer TotalChrom C/S Chromatography Data System. The sample was prepared as a solution in tetrahydrofuran (THF) and the mobile phase consisted of THF (isocratic), with a flow rate of 1.0 milliliters/minute (mL/minute) and a column temperature of 35° C. Eight (8) polystyrene standards were used with peak molecular weights ($M_p$) ranging from 1,000 to 1,200,000 Dalton (Da). The results are shown in Table 4 and in FIG. 1, where RT is retention time in minutes, Mw is weight average molecular weight, Mn is number average molecular weight, and Mw/Mn is polydispersity index. FIG. 1 is a GPC chromatogram where relative peak intensity is a function of time, in minutes.

Figure 2:
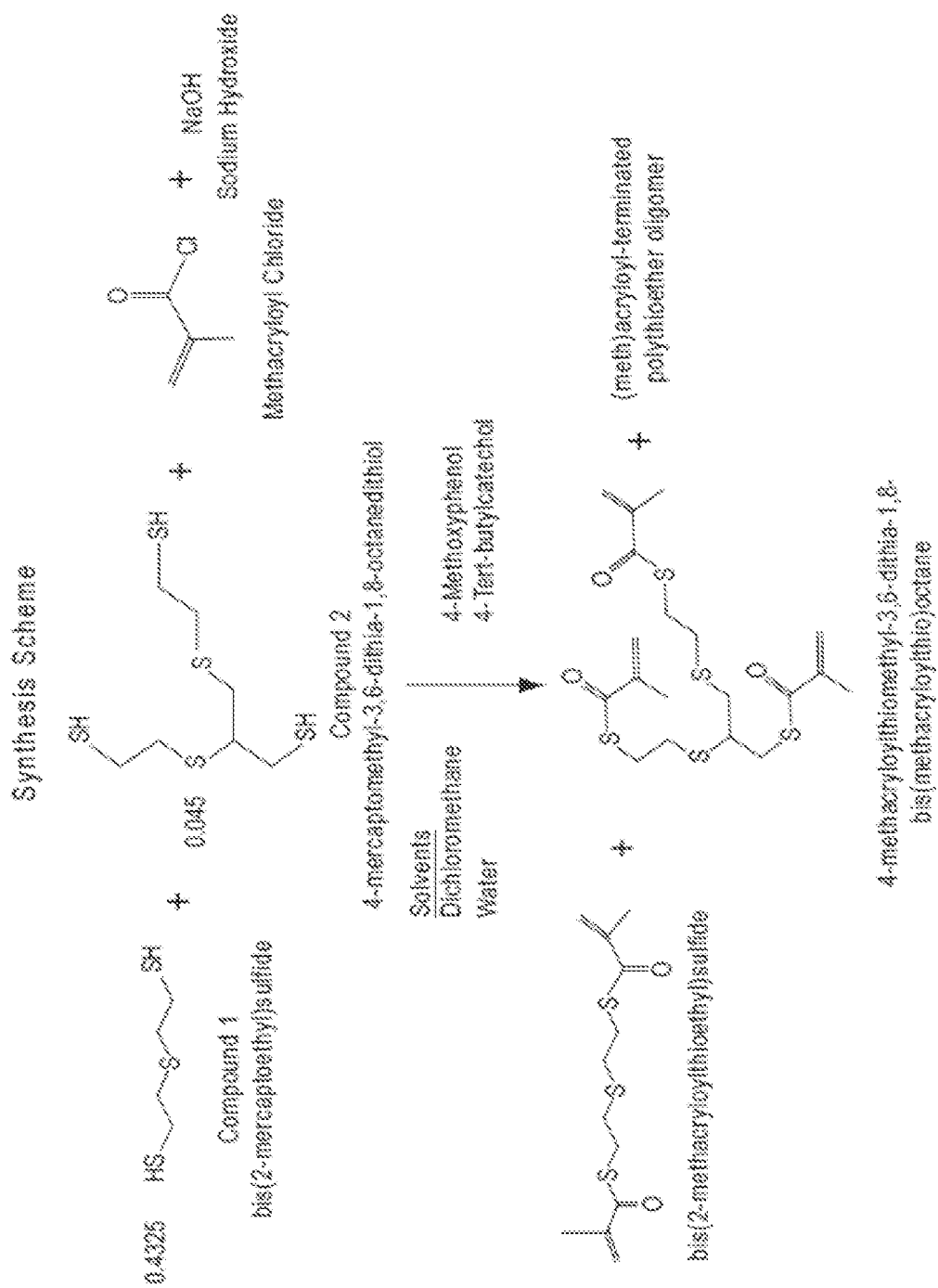
FIG. 2 shows an example of a synthetic scheme for preparing a combination of (meth)acryloyl-terminated monomers and oligomers provided by the present disclosure.

The GPC peak at 18.03 minutes with a peak molecular weight of 240 Da corresponds to bis(2-methacryloylthioethyl)sulfide. The broader GPC peak at 17.93 minutes with a peak molecular weight of 539 Da indicates the presence of oligomeric by-products in addition to 4-methacryloylthiomethyl-3,6-dithia-1,8-bis(methacryloylthio)octane as described in the Synthetic Scheme shown in FIG. 2.

TABLE 4

GPC analysis of a combination of (meth)acryloyl-terminated monomers and oligomers.

| Peak | RT | %Area | $M_p$ | Mw | Mn | Mw/Mn |
|---|---|---|---|---|---|---|
| 1 | 17.93 | 43.8 | 539 | 1040 | 664 | 1.57 |
| 2 | 18.03 | 56.2 | 240 | 227 | 216 | 1.05 |

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof.

TABLE 3

Results summary.

| | | | Cast Lens Polymer Properties | | | | |
|---|---|---|---|---|---|---|---|
| | | | | DMA E' Storage Modulus, GPa | | | |
| Polymerizate | Polymerizable Composition | Fischer Micro-hardness | 25° C. | 75° C. | 95° C. | $n_e^{20}$ | Abbe |
| Comparative Example 7 | Comparative Example 1 | 60-90 | 1-1.5 | 03-0.6 | 0.2-0.5 | 1.627 | 35-36 |
| Comparative Example 8 | Comparative Example 2 | 108 | | NA[1] | | 1.636 | 35 |
| Example 9 | Example 3 | 140-150 | 2.2-23 | 1.1-1.2 | 0.8-1 | 1.636 | 36 |
| Example 10 | Example 4 | 140 | 2.6 | 1.5 | 1.1 | 1.635 | 35 |
| Example 11 | Example 5 | 124 | 2.2 | 1.2 | 0.9 | 1.638 | 35 |
| Example 12 | Example 6 | 140 | 2.6 | 1.4 | 1.1 | 1.628 | 36 |

[1]DMA E' storage modulus could not be measured because an extensive amount of cracking was formed in the lens during the UV curing process.

What is claimed is:

1. A composition comprising:
(a) a first (meth)acryloyl-terminated monomer, wherein the first (meth)acryloyl-terminated monomer has the structure of Formula (1):

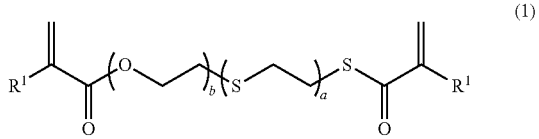

wherein,
each $R^1$ is independently selected from hydrogen or methyl;
b is selected from 0 or 1; and
a is an integer from 1 to 6; and
(b) a second (meth)acryloyl-terminated monomer comprising two or more (meth)acryloyl groups, wherein;
(i) the second (meth)acryloyl-terminated monomer comprises a branched polythiaalkylene moiety and from 3 to 6 (meth)acryloyl groups; or
(ii) the second (meth)acryloyl-terminated monomer comprises at least one (meth)acryloylthio group and at least one (meth)acryloyloxy group; or
(iii) the second (meth)acryloyl-terminated monomer comprises 2,5-bis[(meth)acryloylthiomethyl]-1,4-dithiane, 4-(meth)acryloylthiomethyl-3,6-dithia-1,8-bis[(meth)acryloylthio]octane, 7-(meth)acryloyloxymethyl-3,6,9,12-tetrathia-1,14-bis[(meth)acryloylthio]tetradecane, 4,8-bis[(meth)acryloylthiomethyl]-3,6,9-trithia-1,11-bis[(meth)acryloylthio]undecane and regioisomers thereof, 2-ethyl-2-((meth)acryloylthiomethyl)-1,3-bis[(meth)acryloylthio]propane, and/or 1,2,3-tris[(meth)acryloylthio]propane;
and
the second (meth)acryloyl-terminated monomer (b) is different than the first (meth)acryloyl-terminated monomer (a).

2. The composition of claim 1, wherein a is selected from 1 or 2.

3. The composition of claim 1, wherein the first (meth)acryloyl-terminated monomer comprises bis(2-methacryloylthioethyl)sulfide:

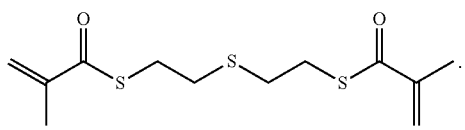 [SMILES: C=C(C)C(=O)SCCSCCSC(=O)C(=C)C]

4. The composition of claim 1, wherein the second (meth)acryloyl-terminated monomer comprises a branched polythiaalkylene moiety and from 3 to 6 (meth)acryloyl groups.

5. The composition of claim 1, wherein the second (meth)acryloyl-terminated monomer comprises at least one (meth)acryloylthio group and at least one (meth)acryloyloxy group.

6. The composition of claim 1, wherein the second (meth)acryloyl-terminated monomer comprises 2,5-bis[(meth)acryloylthiomethyl]-1,4-dithiane, 4-(meth)acryloylthiomethyl-3,6-dithia-1,8-bis[(meth)acryloylthio]octane, 7-(meth)acryloyloxymethyl-3,6,9,12-tetrathia-1, 14-bis[(meth)acryloylthio]tetradecane, 4,8-bis[(meth)acryloylthiomethyl]-3,6,9-trithia-1, 11-bis[(meth)acryloylthio]undecane and regioisomers thereof, 2-ethyl-2-(meth)acryloylthiomethyl)-1,3-bis[(meth)acryloylthio]propane, 1,2,3-tris[(meth)acryloylthio]propane, or combinations of any of the foregoing.

7. The composition of claim 1, wherein the composition further comprises a (meth)acryloyl-terminated oligomer.

8. The composition of claim 1, wherein the composition comprises from 15 wt % to 60 wt % sulfur, wherein wt % is based on the total weight of the composition.

9. The composition of claim 1, wherein,
the first (meth)acryloyl-terminated monomer comprises a first (meth)acryloyl equivalents;
the second (meth)acryloyl-terminated monomer comprises a second (meth)acryloyl equivalents; and
a ratio of the first (meth)acryloyl equivalents to the second (meth)acryloyl equivalents is greater than 1:1.

10. The polymerizable composition of claim 1, further comprising a free radical initiator, wherein the free radical initiator comprises a photoinitiator or a thermally-activated free radical initiator.

11. The polymerizable composition of claim 1, further comprising at least one third monomer, wherein,
the third monomer comprises one or more ethylenically unsaturated radically polymerizable groups; and
the third monomer is different than the first (meth)acryloyl-terminated monomer and from the second (meth)acryloyl-terminated monomer.

12. The polymerizable composition of claim 1, wherein the polymerizable composition further comprises one or more of a thermal stabilizer, a UV stabilizer, a UV absorber, a hindered amine light stabilizer, a dichroic material, a photochromic material, a polymerization moderator, a polymerization accelerator, a pigment, a dye, or a combination of any of the foregoing.

13. The polymerizable composition of claim 12, wherein the polymerization accelerator can comprise an organophosphine, organophosphite, amine, or combinations thereof.

14. A composition comprising the reaction product of reactants comprising:
(i) a first reactant, having two active hydrogen groups, the first reactant having the structure of Formula (5):

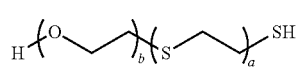

wherein b is selected from 0 or 1; and a is an integer from 1 to 6;
(ii) a second reactant comprising two or more active hydrogen groups, wherein
(a) the second reactant comprises a branched polythiaalkylene moiety and from 3 to 6 active hydrogen groups; or
(b) the second reactant comprises at least one thiol group and at least one hydroxyl group; or
(c) the second reactant comprises at least one of 2,5-dimercaptomethyl-1,4-dithiane, 2-ethyl-2-(mercaptomethyl)propane-1,3-dithiol, 1,2,3-trimercaptopropane, 2,2-bis(mercaptomethyl)propane-1,3-dithiol, 4-mercaptomethyl-3,6-dithia-1,8-octanedithiol, 1,3-dimercapto-2-propanol, 3-mercapto-1,2-propanediol, 2-mercapto-1,3-propanediol, 2,3-dimercapto-1- propanol, 7-hydroxymethyl-1,14-dimercapto-3,6,9,12-tetrathiatetradecane, and 4,8-bis(mercaptomethyl)-1,11-dimercapto-3,6,9-trithiaundecane or regioisomers thereof;
and wherein
the second reactant is different than the first reactant; and
(iii) a third reactant comprising an acrylating agent.

15. The composition of claim 14, wherein a is selected from 1 or 2.

16. The composition of claim 14, wherein the first reactant comprises bis(2-mercaptoethyl)sulfide:

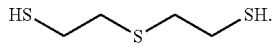

17. The composition of claim 14, wherein the second reactant comprises 2,5-dimercaptomethyl-1,4-dithiane, 2-ethyl-2-(mercaptomethyl)propane-1,3-dithiol, 1,2,3-trimercaptopropane, 2,2-bis(mercaptomethyl)propane-1,3-dithiol, 4-mercaptomethyl-3,6-dithia-1,8-octanedithiol, 1,3-dimercapto-2-propanol, 3-mercapto-1,2-propanediol, 2-mercapto-1,3-propanediol, 2,3-dimercapto-1-propanol, 7-hydroxymethyl-1,14-dimercapto-3,6,9,12-tetrathiatetradecane, 4,8-bis(mercaptomethyl)-1,11-dimercapto-3,6,9-trithiaundecane and regioisomers thereof, or a combination of any of the foregoing.

18. The composition of claim 14, wherein the acrylating agent comprises (meth)acryloyl chloride, or (meth)acrylic anhydride.

19. The composition of claim 14, wherein the active hydrogen group equivalents ratio of the first reactant to the second reactant is greater than 1:1.

20. The composition of claim 14, wherein the reaction product comprises:
a first (meth)acryloyl-terminated monomer, wherein the first (meth)acryloyl-terminated monomer is derived from the first reactant;
a second (meth)acryloyl-terminated monomer, wherein the second (meth)acryloyl-terminated monomer is derived from the second reactant; and
a combination of (meth)acryloyl-terminated oligomers, wherein the combination of (meth)acryloyl-terminated oligomers is derived from the reaction of the first reactant, the second reactant and the acrylating agent.

21. The composition of claim 14, wherein the composition comprises from 15 wt % to 60 wt % sulfur, wherein wt % is based on the total weight of the composition.

22. The polymerizable composition of claim 14, further comprising a free radical initiator, wherein the free radical initiator comprises a photoinitiator or a thermally-activated free radical initiator.

23. A method of fabricating an article, comprising:
forming the polymerizable composition of claim 22 into a shape,
wherein forming comprises casting, additive manufacturing, three-dimensional printing, ink-jet printing, transfer printing, or stereolithography; and
curing the applied composition to provide the article.

24. The method of claim 23, wherein the method comprises exposing the composition to actinic radiation before forming the shape, after forming the shape, during forming the shape, or a combination of any of the foregoing.

* * * * *